(12) United States Patent
Takahashi

(10) Patent No.: US 6,442,480 B1
(45) Date of Patent: Aug. 27, 2002

(54) METHOD AND DEVICE FOR ACQUIRING AZIMUTH INFORMATION

(75) Inventor: Masato Takahashi, c/o Kashima Space Research Center, Communications Research Laboratory, Ministry of Public Management, Home Affairs, Post and Telecommunications 893-1, Hirai, Kashima, Ibaraki (JP)

(73) Assignees: Communications Research Laboratory, Independent Administrative Institution, Tokyo; Masato Takahashi, Kashima, both of (JP)

( * ) Notice: Subject to any disclaimer, the term of this patent is extended or adjusted under 35 U.S.C. 154(b) by 0 days.

(21) Appl. No.: 09/818,844

(22) Filed: Mar. 28, 2001

(30) Foreign Application Priority Data

Mar. 29, 2000 (JP) ........................................ 2000-091362

(51) Int. Cl.[7] ............................. G06G 7/78; H04B 7/185
(52) U.S. Cl. .................... 701/213; 701/215; 342/357.1; 342/359; 340/500
(58) Field of Search ................................. 701/213, 215; 342/352, 356.06, 357.09, 357.1, 357.12, 359.15, 359, 360; 340/500, 521, 522

(56) References Cited

U.S. PATENT DOCUMENTS 5,805,067 A * 9/1998 Bradley et al. .............. 340/552

(List continued on next page.)

OTHER PUBLICATIONS

A. J. Van Dierendonck, Edited by: Paul Zarchan, Global Positioning System: theory and Applications, vol. 1, pp. 342–343, "Progress In Astronautics and aeronautics", vol. 163, 1996.

(List continued on next page.)

Primary Examiner—William A. Cuchlinski, Jr.
Assistant Examiner—Olga Hernandez
(74) Attorney, Agent, or Firm—Oblon, Spivak, McClelland, Maier & Neustadt, P.C.

(57) ABSTRACT

A method for acquiring azimuth information includes the steps of disposing a pair of planar antennas each having a hemispherical antenna pattern for GPS satellite signals back-to-back, parallel to each other and vertical, whereby each planar antenna forms a sky coverage area of antenna sensitivity that is a sky quarter-sphere in the direction the antenna faces; causing a pair of GPS receivers, one connected to each antenna, to scan signals transmitted by GPS satellites in the sky hemisphere; causing the GPS receivers to output respective channel statuses indicating reception of the signal transmitted by each GPS satellite in the sky hemisphere; causing at least one GPS receiver to output satellite azimuth for each GPS satellite in the sky hemisphere; discriminating the sky coverage area in which each GPS satellite that transmitted the signal is present, based oil a comparison of the channel statuses in the GPS receivers; arranging the results of the discriminating step in a ring-like sequence of a specific rotational direction, utilizing the satellite azimuths as indices; and limiting a measurement direction to be ascertained in an azimuth range defined by the start and end azimuths and the orientation of rotation based on information contained in the ring-like sequence of discrimination results obtained in the arranging step. A device for implementing the method includes a pair of planar antennas; a pair of receivers, one connected to each antenna; a device for discriminating which sky coverage area in which each GPS satellite transmitting a signal is present; a device for arranging results output by the discriminating device in a ring-like sequence of a specific rotational direction based on satellite azimuth information acquired from at least one of the receivers; and a device for determining the azimuth of a measurement direction to be ascertained derived from the obtained ring-like sequence of discrimination results.

17 Claims, 7 Drawing Sheets

U.S. PATENT DOCUMENTS

| | | | | |
|---|---|---|---|---|
| 5,852,401 A | * | 12/1998 | Kita | 340/521 |
| 5,864,316 A | * | 1/1999 | Bradley et al. | 342/359 |
| 5,949,369 A | * | 9/1999 | Bradley et al. | 342/352 |
| 5,995,041 A | * | 11/1999 | Bradley et al. | 342/357.1 |
| 6,014,608 A | * | 1/2000 | Seo | 340/903 |
| 6,281,839 B1 | * | 8/2001 | Nielsen | 342/372 |

OTHER PUBLICATIONS

J. J. Spilker, et al., pp. 722–723, "Interference Effects And Mitigation Techniques".

Misao Haneishi, et al., A Corporate Judicial Person, Electronic, Information and Communication Society, pp. 100–101, "Small–Sized Planar Antenna", May 15, 1998.

* cited by examiner

FIG. 7(a)
FIG. 7(b)
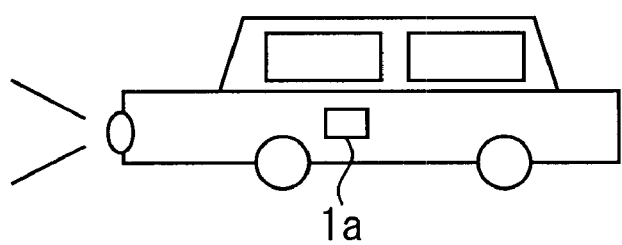
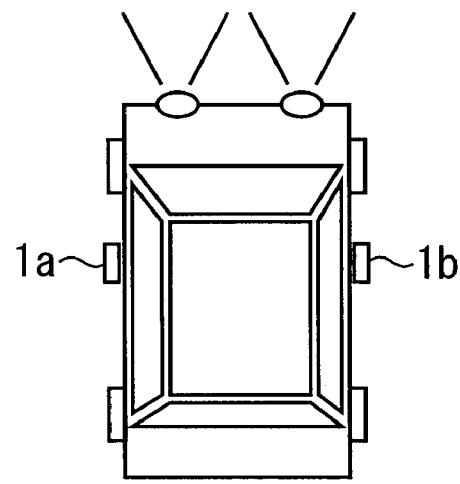
FIG. 8
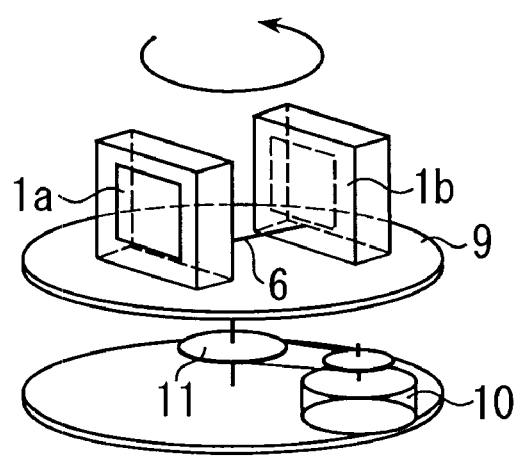

METHOD AND DEVICE FOR ACQUIRING AZIMUTH INFORMATION

BACKGROUND OF THE INVENTION

1. Field of the Invention

This invention relates to a method for acquiring azimuth information by use of GPS (Global Positioning System) satellites and to a device for acquiring azimuth information for implementing the method.

2. Description of the Prior Art

The term "acquiring azimuth information" as used in this specification encompasses both the concept of "azimuth determination," meaning to associate an azimuth uniquely with a specific direction, and the concept of "azimuth limitation," meaning to associate a sector-shaped azimuth range defined by a start azimuth, an end azimuth and a direction of rotation with a specific direction.

Azimuth limitation will be explained first. Consider, for instance, the case of using a representation system in which angular distance (number of degrees) increases clockwise from due north defined as 0 degree. In this system, associating an azimuth of 37 degrees with the specific direction in which one sees a mountain would amount to azimuth determination. On the other hand, if one cannot obtain information of this exactness but, based on some type of information, determines the fact that the direction in question certainly falls within a sector defined by clockwise rotation between an azimuth of 35 degrees and an azimuth of 49 degrees, this would amount to azimuth limitation.

Azimuth limitation becomes a truly useful measure when it can be effected much more rapidly than azimuth determination. A system capable of either rapid azimuth limitation or precise azimuth determination, as occasion demands, has still greater utility. This is because azimuth determination can be conducted when priority is on precision and azimuth limitation be conducted when priority is on speed.

That both azimuth determination and azimuth limitation are actually necessary can be seen from the following concrete example.

Consider the case of a visually impaired person walking outdoors or of a forest ranger, surveyor or other such person who has no choice but to walk through a mountainous region in dense fog, a blizzard or other circumstances of substantially zero visibility. Any of these people would have to walk without being able to see their surroundings. Although a forest ranger or surveyor should be prepared to bivouac, either might decide to continue walking despite zero visibility if having good reason to expect a life-threatening drop in temperature after sunset or a threat to life owing to the approach of a blizzard.

Walking in zero-visibility condition (blind walking) is characterized by the following points:

First, even if a numerical azimuth value for reaching the destination can be obtained from the latitude and longitude of the current location ascertained using a mobile satellite positioning device and the known latitude and longitude of the destination, as is often possible, zero-visibility effectively deprives one of the ability to acquire general azimuth information easily by the sense of vision, so that, in the absence of some other azimuth information acquisition means, the obtained value cannot be used for effectively deciding one's course of action. On the other hand, a compass cannot be used for determining such an important matter as the direction to walk during zero-visibility condition because, depending on the location, the direction indicated by a compass may be strongly affected by magnetic disturbance and deviate greatly from the true direction, and, moreover, is incapable of producing an output indicative of the deviation (error span). The method used by land vehicles of calculating travel direction by repositioning after a suitable amount of travel is also of no use because for this method to work the person attempting to decide the right walking direction would have to walk a distance so great as to be excessively burdensome or sometimes dangerous under condition of zero visibility. The mobile satellite positioning device, being unable to provide an azimuth, is functionally deficient as a tool for supporting a person in zero-visibility condition and incapable of vision-dependent general azimuth approximation in making appropriate walking direction decisions. A method for acquiring azimuth information that can compensate for this shortcoming is therefore necessary.

Second, even if a person should be able to decide a specific direction of travel by some method or other, the person will have difficulty maintaining the travel direction accurately in zero-visibility condition. This is because a person generally maintains a straight line of travel using a feedback loop involving fine correction of travel direction based on a direction visually perceived from a ground feature, a heavenly body or the like, but this is impossible in zero-visibility condition. Unless a person makes frequent direction checks, then, just as when walking with eyes closed, he or she will veer off the initially intended course and is liable to stray into a dangerous region such as one where avalanches are common. The required frequency of the checks is very high. A method that requires considerable work to carry out a check would therefore excessively restrict the person's actions and be worthless from the practical viewpoint. A person walking in zero-visibility condition needs a fast method for acquiring azimuth information that can be simply implemented while continuing to walk and is suitable for frequent information acquisition.

Third, to avoid stumbling, a person who cannot rely on vision must constantly check for the presence of obstacles ahead with the hand or a stick or other extension from the hand. An azimuth determination/azimuth limitation device such as mentioned above would therefore not be very useful in a hand-carried configuration. A device to be worn on the body or clothing is therefore appropriate so as not to restrict the ability of the person walking in zero-visibility condition to grope and probe for the presence of obstacles ahead.

In view of the foregoing considerations, a device for acquiring azimuth information requires the following features for supporting blind walking. First, it must have the ability to determine azimuth with a certain degree of accuracy so as to enable a person walking in zero-visibility condition to initially decide the walking direction to the destination upon obtaining the latitude and longitude of the current location and the destination. Second, to enable a person walking in zero-visibility condition to frequently check whether or not his or her direction of travel deviates from the intended direction, it must be capable of rapid and simple measurement and, further include an azimuth limitation function capable of indicating degree of error. Third, since a person walking in zero-visibility condition strongly needs free use of the hands for discerning obstacles ahead and avoiding falls, it is preferably structured to be worn directly on the body or clothing.

An object of the present invention is therefore to provide a method and device for acquiring azimuth information in zero-visibility condition.

Another object of the present invention is to provide a device for acquiring azimuth information that can be readily worn on the body or clothing.

SUMMARY OF THE INVENTION

For achieving these objects, this invention provides a method for acquiring azimuth information comprising:

a step of disposing a pair of planar antennas each having a hemispherical antenna pattern for GPS satellite signals back-to-back, parallel to each other and vertical, whereby each planar antenna forms a sky coverage area of antenna sensitivity that is a sky quarter-sphere in a direction the antenna faces;

a step of causing a pair of GPS receivers, one connected to each antenna, to scan signals transmitted by GPS satellites in the sky hemisphere;

a step of causing the GPS receivers to output respective channel statuses indicating reception of the signal transmitted by each GPS satellite in the sky hemisphere;

a step of causing at least one GPS receiver to output satellite azimuth for each GPS satellite in the sky hemisphere;

a step of discriminating the sky coverage area in which each GPS satellite that transmitted the signal is present, based on a comparison of the channel statuses in the GPS receivers;

a step of arranging results of the discriminating step in a ring-like sequence of a specific rotational direction, utilizing the satellite azimuths as indices; and a step of limiting a measurement direction to be ascertained as a value in an azimuth range defined by a start azimuth, an end azimuth and an orientation of rotation based on information contained in the ring-like sequence of discrimination results obtained in the arranging step.

In the method just mentioned above, the planar antennas may be planar patch antennas.

In the foregoing method, when a signal of a certain GPS satellite is synchronized with by a corresponding pseudo random noise code in a channel of one GPS receiver and the same signal is not synchronized with by a corresponding pseudo random noise code in a channel of the other GPS receiver, discrimination that the certain GPS satellite is present in the antenna sky coverage area formed by the antenna 40 connected to the one GPS receiver is conducted.

In the foregoing method, when the ring-like sequence of discrimination results consists of one finite sequence which consists of one or more continuous terms indicating presence in the coverage area of one planar antenna, no or one finite sequence which consists of one or more continuous terms indicating presence in the coverage area of the other planar antenna, and no finite sequence which consists of one or more continuous terms indicating presence at a boundary between the antenna coverage areas, the azimuth of the measurement direction to be ascertained is limited in the azimuth range, based on satellite azimuths associated with a first term and a last term in the one or two finite sequences and an initial assumption on geometry among the antennas and the measurement direction.

In the foregoing method, the antennas can be disposed, one on either side of a user's head or body.

The present invention further provides a method for acquiring azimuth information, comprising:

a step of disposing a pair of planar antenna each having a hemispherical antenna pattern for GPS satellite signals back-to-back, parallel to each other and vertical, whereby each planar antenna forms a sky coverage area of antenna sensitivity that is a sky quarter-sphere in a direction the antenna faces;

a step of horizontally rotating the antennas;

a step of causing a pair of GPS receivers, one connected to each antenna, to scan signals transmitted by GPS satellites in the sky hemisphere;

a step of causing the GPS receivers to output respective channel statuses indicating reception of the signal transmitted by each GPS satellite in the sky hemisphere;

a step of causing at least one GPS receiver to output satellite azimuth for each GPS satellite in the sky hemisphere;

a step of stopping the horizontal rotation of each antenna when the antenna reaches an orientation whereat discrimination is conducted that at least one GPS satellite is present at a boundary between the sky coverage areas of the antennas;

a step of discriminating, with regard to remaining GPS satellites, the sky coverage area in which a GPS satellite that transmitted the signal is present, based on a comparison of the channel statuses;

a step of arranging results of the discriminating step in a ring-like sequence of a specific rotational direction, utilizing the satellite azimuths as indices; and a step of determining an azimuth of a measurement direction to be ascertained based on information contained in the ring-like sequence of discrimination results obtained in the arranging step.

In the method just mentioned above, the planar antennas may be planar patch antennas.

In the foregoing method, when a signal of a certain GPS satellite is synchronized with by a corresponding pseudo random noise code in channels of the GPS receivers, discrimination that the certain GPS satellite is present at a boundary between the sky coverage areas of the antennas is conducted.

In the foregoing method, when the ring-like sequence of discrimination results consists of one first-finite sequence which consists of one or more continuous terms indicating presence in the coverage area of one planar antenna, no or one second-finite sequence which consists of one or more continuous terms indicating presence in the coverage area of the other planar antenna, one third-finite sequence which consists of one or more continuous terms indicating presence at one direction on a boundary between the antenna coverage areas, and no or one fourth-finite sequence which consists of one or more continuous terms indicating presence at the other direction on the boundary between the antenna coverage areas, the azimuth of the measurement direction to be ascertained is determined based on satellite azimuths associated with terms in the one first-finite sequence and the one third-finite sequence, and an initial assumption on geometry among the two antennas and the measurement direction.

In the foregoing method, the antennas can be disposed, one on either side of a user's head or body.

The present invention also provides a device for acquiring azimuth information comprising:

- a pair of planar antennas each having a hemispherical antenna pattern for receiving signals transmitted by GPS satellites, disposed back-to-back, parallel to each other and vertical, whereby each planar antenna forms a sky coverage area of antenna sensitivity that is a sky quarter-sphere in a direction the antenna faces;
- a pair of receivers, one connected to each antenna, for receiving signals transmitted by GPS satellites present in the sky coverage areas, conducting positioning concomitantly with calculating azimuths of all satellites, and outputting channel statuses;
- means for discriminating which sky coverage area in which each GPS satellite transmitting a signal is present, based on a comparison of the channel statuses in the receivers;
- means for arranging results output by the discriminating means in a ring-like sequence of a specific rotational direction based on satellite azimuth information acquired from at least one of the receivers; and
- means for limiting an azimuth of a measurement direction to be ascertained in an azimuth range which is defined by a start azimuth, an end azimuth and an orientation of rotation and determining the azimuth of the measurement direction to be ascertained as a value, both based on information derived from the thus obtained ring-like sequence of discrimination results.

In the device, the arranging means may be means including as indices satellite azimuths calculated concomitantly with positioning.

In the device, the antennas can be disposed, one on either side of a user's head or body.

The device can further comprise means for horizontally rotating the antennas at a constant speed within the azimuth range.

Being constituted in the foregoing manner, the present invention can provide support for the everyday outdoor activities or outdoor work activities of a visually impaired person and can also offer various kinds of help to normal, unimpaired persons working outdoors under poor visibility conditions. Some of the benefits provided by the invention include:

(1) Azimuth limitation and azimuth determination helpful for carrying out everyday activities can be provided by one and the same device. The first of these functions, azimuth limitation, can be executed straightaway with substantially zero wait time. (This is particularly useful for a visually impaired person during walking because such a person needs to confirm the direction of advance with high frequency to stay on a straight course.) The second function, azimuth determination, enables the user to acquire exact azimuth information simply by turning the antennas within a limited degree of rotation. (This function provides the precise directional information that a visually impaired person needs for deciding what action to take.)

(2) The device can be implemented in a compact, lightweight configuration that can be worn on the head or clothing during use.

(3) The device can be fabricated at relatively low cost using inexpensive components commercially available for fabricating portable satellite positioning equipment.

(4) The device can be given an appearance readily acceptable by visually impaired persons for use (wearing) in public places.

(5) When the patch antennas are fitted on the user's head or body, the user can easily select the direction whose azimuth is to be measured because the measured direction coincides with the direction in which the user's face or body is directed. Operation is therefore direct and intuitive and there is no need to convert the acquired azimuth information to that for the direction of interest.

(6) The device eliminates the need to carry a satellite positioning device and a device for acquiring azimuth information as separate units, thus reducing the number and bulk of the articles that need be carried. This is particularly advantageous for outdoor activities that limit the amount of gear that can be taken along.

The above and other objects and features of the invention will become apparent from the following description made with reference to the accompanying drawings.

BRIEF EXPLANATION OF THE DRAWINGS

FIG. 7(a) is a side view of a vehicle having a pair of antennas according to the present invention attached one on either side.

FIG. 7(b) is a top view of the arrangement shown in FIG. 7(a).

FIG. 8 is a perspective view illustrating a device for acquiring azimuth information according to another embodiment of the present invention.

DESCRIPTION OF THE PREFERRED EMBODIMENTS

Embodiments of the method and device for acquiring azimuth information according to this invention will now be explained with reference to the attached drawings.

In the following explanation, degree (deg) is used as the unit for angles, with north defined as 0 degree and, moving clockwise, east as 90 degrees, south as 180 degrees and west as 270 degrees. Angle of elevation is defined as 0 degree at horizontal and 90 degrees at zenith.

Figure 1:
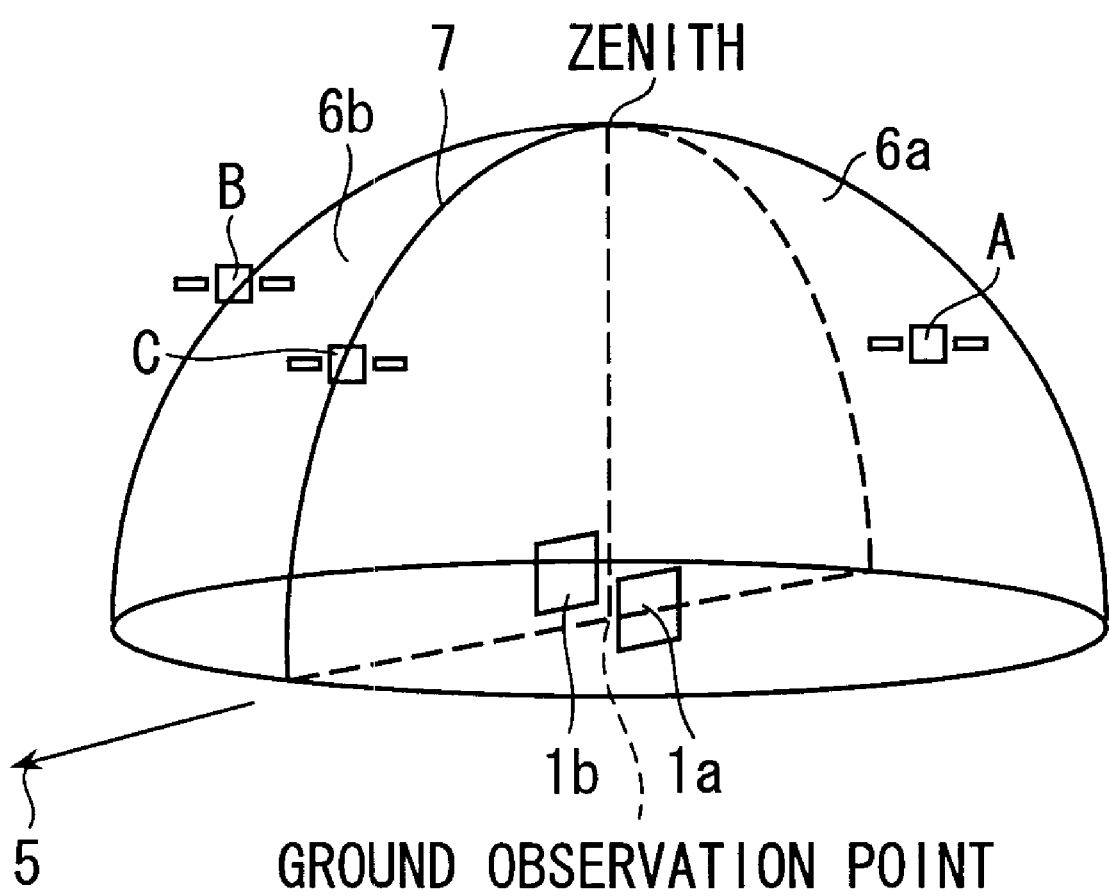
FIG. 1 is a schematic diagram illustrating the principle of azimuth information acquisition according to the present invention.

The principle of the azimuth limitation of the present invention will first be explained with reference to FIG. 1. Near the middle of FIG. 1 are disposed a first planar patch antenna 1a and a second planar patch antenna 1b. The first planar patch antenna 1a and second planar patch antenna 1b are disposed back-to-back and parallel with each other. Both antennas are perpendicular to the ground. The direction in which an observer faces when standing on the ground and looking down on the antennas arranged with the first planar patch antenna 1a on the left and the second planar patch antenna 1b on the right is defined as the measurement direction 5.

The first and second patch antennas 1a, 1b are provided with hemispherical beam patterns with respect to the Right Hand Circularly Polarized (RHCP) L-band signal known as L1 at 1575.42 MHz used by standard positioning service of the GPS satellite system. The antenna having a hemispherical beam has on rare occasions been referred to in technical papers as being nondirectional. Strictly speaking "nondirectional" cannot be used to describe the antenna because "nondirectional" means "isotropic". The first and second patch antennas 1a, 1b stand perpendicular to the ground. Half of the hemispherical beam is therefore directed toward the ground and is unusable. The remaining half has sensitivity in the direction of the sky.

When two such planar patch antennas are disposed back-to-back in parallel with both standing perpendicular to the ground, the coverage area to which the antenna sensitivity of each (i.e., the first planar patch antenna 1a or the second planar patch antenna 1b) extends coincides with half of the sky divided in two by a great circle 7, as shown in FIG. 1. This great circle 7 forms the boundary between the coverage area 6a of the first planar patch antenna 1a and the coverage area 6b of the second planar patch antenna 1b. In other words, the coverage area 6a of the first planar patch antenna 1a is the sky quarter-sphere in which the GPS satellite A is present and the coverage area 6b of the second planar patch antenna 1b is the sky quarter-sphere in which the GPS satellite B is present.

The signal of standard positioning service transmitted by a GPS satellite has a microwave band frequency of 1575.42 MHz and, therefore, exhibits excellent linear propagation property like light. Therefore, when observed by the first planar patch antenna 1a, a distinct difference arises between the receiving status for signal from the GPS satellite A in the coverage area 6a and the receiving status for signal from the GPS satellite B not in the coverage area 6a.

Figure 2:
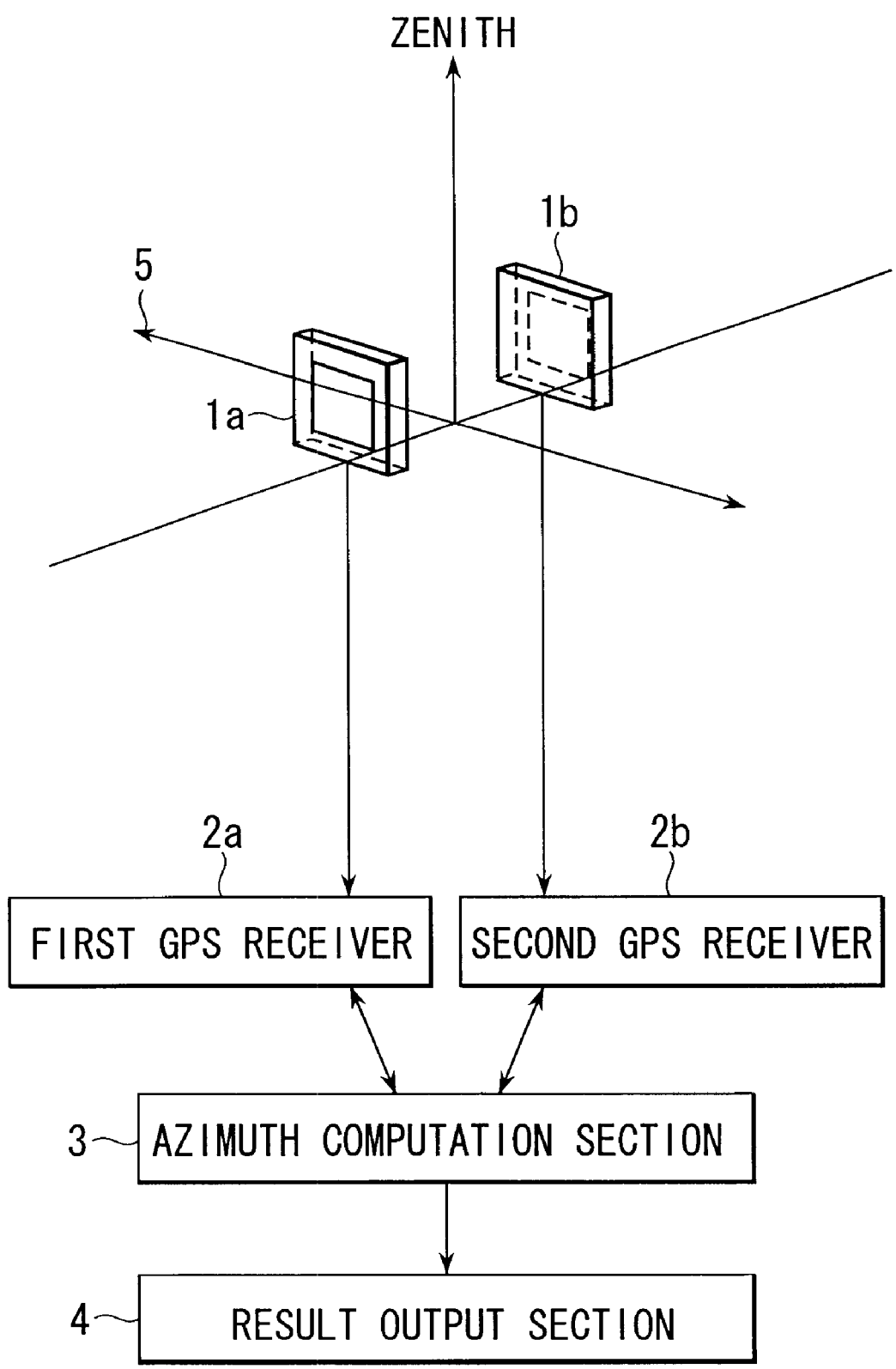
FIG. 2 is a schematic diagram illustrating an embodiment of a device for acquiring azimuth information that is a concrete implementation of the method for acquiring azimuth information according to the present invention.

As shown in FIG. 2, the first planar patch antenna 1a is connected to the first GPS receiver 2a and the second planar patch antenna 1b is connected to the second GPS receiver 2b.

Considering FIG. 1 and FIG. 2 together, the first GPS receiver 2a in FIG. 2 can receive the signal from GPS satellite A in FIG. 1 and cannot receive the signal from GPS satellite B in FIG. 1, and the second GPS receiver 2b in FIG. 2 can receive the signal from GPS satellite B in FIG. 1 and cannot receive the signal from GPS satellite A in FIG. 1.

In other words, the synchronization mechanism in the first GPS receiver 2a in FIG. 2 can synchronize with the signal transmitted from Satellite A in FIG. 1 with a corresponding Pseudo Random Noise code (PRN code) generated by the receiver to despread the signal and cannot synchronize with the signal from satellite B in FIG. 1 with a PRN code generated by the receiver to despread the signal, because the first planar patch antenna 1a connected to the first GPS receiver 2a has its sensitivity to the coverage area in the sky 6a in which the GPS satellite A is present and does not have its sensitivity to sky hemisphere area in the sky 6b in which the GPS satellite B is present.

On the other hand, the synchronization mechanism in the second GPS receiver 2b in FIG. 2 can synchronize with the signal from Satellite B in FIG. 1 with a PRN code generated by the receiver to despread the signal and cannot synchronize with the signal from satellite A in FIG. 1 with a PRN code generated by the receiver to despread the signal, because the second planar patch antenna 1b connected to the second GPS receiver 2b has its sensitivity to the coverage area in the sky 6b in which the GPS satellite B is present and does not have its sensitivity to sky hemisphere area in the sky 6a in which the GPS satellite A is present.

Comparing channel statuses, which is either "scanning" or "synchronized", corresponding to a certain GPS satellite in sky hemisphere, in the first GPS receiver 2a and the second GPS receiver 2b, the region in which the aforesaid GPS satellite is present can be discriminated. As described in detail later, this discrimination result will be associated with the satellite azimuth and is used to derive an azimuth limitation on the measurement orientation.

In FIG. 1, a GPS satellite C is present on the great circle 7 forming the boundary between the coverage area 6a of the first planar patch antenna 1a and the coverage area 6b of the second planar patch antenna 1b. The signal from the GPS satellite C is therefore received by the first planar patch antenna 1a and the second planar patch antenna 1b.

Considering FIG. 1 and FIG. 2 together, the signal from the GPS satellite C in FIG. 1 can be received by the first GPS receiver 2a and the second GPS receiver 2b in FIG. 2.

In other words, both the synchronization mechanisms in the first GPS receiver 2a in FIG. 2 and the second GPS receiver 2b in FIG. 2 can synchronize with the signal from Satellite C in FIG. 1 with a PRN code corresponding to the GPS satellite to despread the signal, because both the first planar patch antenna 1a connected to the first GPS receiver 2a and the second planar patch antenna connected to the second receiver 2b have their sensitivities at the great circle 7 in which the GPS satellite C is present.

In the present invention, when signals are received simultaneously by both GPS receivers in this manner, it becomes possible to discriminate the direction of the GPS satellite C as the measurement direction 5 or as the direction opposite the measurement direction, and, by using the satellite azimuth of GPS satellite C and the aforesaid satellite azimuth information of the GPS satellite A or the GPS satellite B and 10 the result of the area discrimination, to determine the azimuth of the measurement direction 5.

Major characteristics of a planar patch antenna used for azimuth information acquisition include small size, light weight and ease of manufacture. The easiest way to create hemispherical beam pattern planar patch antenna is to block the extra sensitivity of a planar patch antenna having wider beam pattern than hemisphere by shield material. In the actual fabrication of a planar patch antenna, the completed antenna may have a solid angle slightly broader than the hemisphere that is the width theoretically calculated at the time of design. This occurs because the result of the design assuming an infinite ground plate in the theoretical calculation differs from the actual situation. This is discussed in the following literature references:

Small Plane Antennas: Misao Haneishi, Kazuhiro Hirasawa and Yasuo Suzuki published by the Institute of Electronics, Information and Communication Engineers, Aug. 10, 1996, p 100, and Global Positioning System: Theory and Applications Volume I edited by Bradford W Parkinson and James J. Spiker Jr. published by the American Institute of Aeronautics and Astronautics, Inc. 1996, pp342–343, p722.

The technique of correcting such beam shape deviation by slightly modifying the substrate size, patch size or the like to obtain the desired antenna pattern is known as antenna pattern shaping.

In this invention, however, even when the beam of solid angle shape comes out somewhat broader than desired, the antenna can still be used as it is. In this case, the great circle in FIG. 1 is not a line but is a band of small width (small visual angle as seen by an observer). The slight spread imparts a small width to the measurement direction 5 and the direction opposite the measurement direction and increases the probability of catching a satellite with these directions by chance, which enables azimuth determination immediately fortuitously even when intending azimuth limitation. On the other hand, the slight spread can be expected to lower the precision during azimuth determination slightly but this is not a major practical problem in achieving the object of the present invention. The fact that some degree of tolerance exists is preferable from the viewpoint of production cost.

The first GPS receiver 2a and second GPS receiver 2b shown in FIG. 2 can have the same functional features and specifications as the GPS receivers included in widely-used compact mobile positioning devices employing L1 signals. This makes it possible to take advantage of technologies developed for the production of small, lightweight civilian GPS positioning devices, most notably size reduction and ease of volume production. Thanks to size and weight reduction achieved in civilian GPS positioning devices, GPS receivers are abundantly available in sizes commensurate with planar patch antennas. They are also easy to manufacture. Moreover, these GPS receivers have planar patch antennas formed integrally with the receiver case, and inexpensive palm-sized models are already available. Production technologies are well established. The considerable store of miniaturization technologies available today can be utilized for economical fabrication of the device according to this invention.

The first GPS receiver 2a attempts to synchronize with and decode satellite signals through the first planar patch antenna 1a and to determine position. Similarly, the second GPS receiver 2b attempts to synchronize with and decode satellite signals through the second planar patch antenna 1b and to determine position. In other words, the first GPS receiver 2a and the second GPS receiver 2b conduct a search for the signals from all GPS satellites expected to be present in the sky, just as does the GPS receiver of an ordinary mobile satellite positioning device, in exactly the same way as if connected with antennas whose coverage areas are the sky hemisphere.

The only one difference at this point, between the GPS receivers in an embodiment of the device for acquiring azimuth information according to this invention and the GPS receiver of an ordinary mobile satellite positioning device, is the fact that the GPS receiver 1a cannot synchronize with the signals from GPS satellites not being in the coverage area in the sky 6a and the GPS receiver 1b cannot synchronize with the signals from GPS satellites not being in the coverage area in the sky 6b while the GPS receiver of an ordinary mobile satellite positioning device placed horizontally can synchronize with the signals from all GPS satellite in the sky.

The signal transmitted from every GPS satellite contains information on the orbits of all GPS satellites (almanac data). Every satellite transmits this data. Therefore, in the case of a satellite present in the sky at an angle of elevation of greater than 0 degree viewed from the current location but whose signal is blocked by a building or the topography, or of a satellite not in the antenna coverage area whose signal is not synchronized with, i.e., in the case of a GPS satellite in a state preventing reception of its radio wave; the angle of elevation and azimuth of the satellite concerned can be computed and output by a simple calculation from data received from another GPS satellite. Equipment that outputs such information actually exists.

Although all GPS satellites transmit signals at exactly the same frequency, owing to the utilization of a technology called the spread spectrum communication system made possible by Pseudo Random Noise coding, signal interference does not occur even when using the same frequency. Each GPS satellite is assigned a unique Pseudo Random Noise code which is a different digital signal sequence wherein 0 and 1 appear to alternate irregularly. This enables the signals from the satellites to be distinguished and separately received. In other words, the principle of Pseudo Random Noise coding makes it easy to discriminate the signal from each GPS satellite present at an angle of elevation of greater than 0 degrees as viewed from the current location.

The data of each satellite, i.e., the satellite ID of the GPS satellite, satellite angle of elevation, satellite azimuth and channel status for the satellite, are periodically output by both GPS receivers. The positioning result data, i.e., the latitude, longitude, altitude, positioning calculation time and current time, are also periodically output by both GPS receivers.

There is no particular restriction on the data output period. GPS receivers that output data about once per second are currently in wide use. A shorter output period is also workable when available.

The data acquired by the first GPS receiver 2a and the data acquired by the second GPS receiver 2b are input to an azimuth computation section 3. The azimuth computation section 3 processes the data in the following manner.

With respect to the satellite data, the azimuth computation section 3 first generates a data chart for azimuth information acquisition. Positioning result data (latitude, longitude, altitude, positioning calculation time, positioning mode and current time) are stored in a buffer of the azimuth computation section 3 and, after being used for the purpose of reference if required to speed up the positioning calculation, are communicated to a result output section 4. The lines of the data chart for azimuth information acquisition correspond to the respective GPS satellites. The maximum number of lines of the data chart is equal to the number of the channels which the GPS receiver has to synchronize with signals from GPS satellites in parallel. It is the maximum number of satellites for which the first GPS receiver 2a and the second GPS receiver 2b are capable of conducting parallel signal processing. For the purposes of this description, it will be assumed that the maximum number of satellites for which the first GPS receiver 2a and the second GPS receiver 2b are each capable of conducting parallel signal processing is 12, which is equal to the capability of current mobile positioning devices in practical civilian-level applications.

The items assigned to the respective columns will now be explained. The satellite IDs are periodically registered in the first column. The inputs of satellite IDs from the first GPS receiver 2a and the second GPS receiver 2b are assumed to represent identical values. If they are not identical, more than 12 satellites are present in the sky or one of GPS receivers in the course of acquiring the latest almanac data from a satellite and is using somewhat old almanac data. The two receivers 2a and 2b are, therefore, attempting to pick up different sets of satellite IDs. In this case, the set of satellite IDs selected by one GPS receiver that indicates more recent time regarding positioning calculation time than the other is detected by the azimuth computation section 3 and the other GPS receiver is instructed to select the same satellites. Mobile satellite positioning device GPS receiver units equipped with a feature for designating the satellite IDs of satellites whose signals are to be picked up are already on the market.

The second column stores the satellite azimuths and is updated periodically. The third column stores the satellite angles of elevation and is updated periodically. The inputs relating to the second and third columns are obtained from one GPS receiver that indicates more recent time regarding positioning calculation time than the other.

At this point, the information regarding angle of elevation is examined and data from any GPS satellite whose angle of elevation is very high is removed to prevent use of the data in later processing. Even if satellites whose angles of elevation shown in the third column are very high (near zenith) are observed to have azimuths that differ numerically, they should not be used as the basis for azimuth information calculation because the actual elongation among them is very small. Satellites having an angle of elevation of, for example, 85 degrees or greater are therefore not used in the ensuing azimuth information acquisition. When the examination leads to a decision to exclude a satellite with a high angle of elevation, this fact is entered in the sixth column. When the satellite's angle of elevation changes and the satellite no longer need be excluded for having a high angle of elevation, the entry is cleared.

The status of channel in the first GPS receiver 2a, attempting reception of the signal from a GPS satellite, is periodically stored in the fourth column as channel status in the first GPS receiver. The status of channel in the second GPS receiver 2b, attempting reception of the signal from a GPS satellite, is also periodically stored in the fifth column as channel status in the second GPS receiver.

Most common GPS receivers employ a single hemispherical beam antenna. The output of the antenna is fed to a radio frequency filter/low-noise amplifier combination. The signal passes through serial stages of radio frequency amplification, down-conversion, and intermediate frequency (IF) amplification and sampling/quantizing. At the present state of the art, the functions of radio frequency amplification, down-conversion, IF amplification and A/D sampling can be implemented with a single MMIC (Monolithic Microwave Integrated Circuit) chip. The samples are then fed to a parallel set of DLLs (Delay Lock Loop) each of which makes an attempt to acquire and track synchronization with a different satellite signal, which is spread by a unique PRN (Pseudo Random Noise) code with 1023 chip length. After acquiring and tracking synchronization with the signal, the carrier phase, which is bi-phased and modulated with the GPS navigation data, is recovered. The DLLs and associated demodulators provide estimates of the pseudo-range and navigation data for each satellite. Typically, the number of parallel DLLs is 12. At the present state of the art, a 12-channel receiver with 12 parallel DLLs can be implemented on one CMOS chip. Then parallel measurement of pseudo-ranges and carrier phase along with the navigation data for each satellite are then sent to the navigation data processor where the position of each satellite is calculated from the navigation data in sub-frames 2 and 3 at the time of each pseudo-range measurement. The navigation data processor estimates current user position and current GPS time by data of four GPS satellites (for three-dimensional positioning) or three GPS satellites (for two-dimensional positioning). At the same time, azimuth and elevation angles of each satellite can be concomitantly calculated. Most of common GPS receivers can periodically output the azimuth and elevation angles, and IDs of each satellite and each channel status that shows either "synchronized with" or "scanning" corresponding to GPS signal as well as normal positioning result including latitude, longitude, altitude, positioning calculation time, current time (based on GPS time), and positioning calculation mode.

The device for acquiring azimuth information that is an embodiment of the device for acquiring azimuth information according to this invention can take advantage of the periodical output of status of the channel for each GPS satellite signal and the azimuth angle of each GPS satellite which is concomitantly calculated on positioning in most of common GPS receivers.

The number of available GPS satellites in sky hemisphere viewed from a middle latitude area is usually as many as 8 to 12. Even when the GPS antenna set vertical is used, it is expected that the number of GPS satellites is 4 to 6. The number is enough to make a positioning calculation in order to obtain GPS satellite azimuths.

Signal blocking by ground features, topography etc. will now be considered. Even if a given satellite is present in the coverage area of one antenna, synchronization with the signal from the satellite will not be established if the propagation path is blocked by the topography, an artificial structure, or other such ground features. When neither synchronization with the signal in a channel in the first GPS receiver nor synchronization with the signal in a channel in the second GPS receiver is established, therefore, the probability of the satellite being blocked by a ground feature or the topography is very high. The information from such a satellite is excluded from use in the calculation of azimuth information. When a decision is made to exclude a satellite owing to blocking by a ground feature or the topography, this fact is entered in the sixth column. When at least one channel status indicates that synchronization with the signal from the GPS satellite concerned is established, the entry is cleared.

The satellite azimuth data in the second column are used to reorder the satellites other than those excluded by the aforesaid two types of exclusion decisions, i.e., decision to exclude owing to high angle of elevation and decision to exclude owing to ground feature or topography blocking. As the azimuth notation adopted defines north as 0 degree and the number of degrees to increase clockwise, sorting in ascending order results in the satellite azimuths being arranged in order starting from north as the origin and moving clockwise.

The fourth column (channel status in the first GPS receiver) and the fifth column (channel status in the second GPS receiver) are compared and the region in which each satellite is present is discriminated. With regard to a GPS satellite, when the channel status in one antenna system shows "synchronized" and the channel status in the other antenna system does not indicate "synchronized", the satellite can be concluded to be present in the coverage area of the former antenna. In this case, the number of the former antenna, i.e., "1" if it is the antenna 1a of the first GPS receiver 2a and "2" if it is the antenna 1b of the second GPS receiver 2b, is stored in the seventh column. With regard to a satellite, when the channel statuses in both antenna systems show "synchronized", the satellite is present on the great circle where an extension of the back-to-back surfaces of the antennas intersects the sky hemisphere. The number 0 representing this fact is stored in the seventh column.

The azimuth computation section 3 can generate the data chart by the foregoing procedure.

The azimuth computation section 3 then reads the seventh column of the data chart (result of region discrimination) from top to bottom for all satellites other than those indicated for exclusion in the sixth column. Since rows have already been sorted by the satellite azimuth in ascending order, this amounts to reading the satellite region discrimination results in order of ascending satellite azimuth, when considered in the clockwise direction with north defined as the origin.

The result is a sequence composed of 0, 1 and 2 as terms. Assuming that the last term of this sequence is followed by the first term, a directional ring-like sequence (hereinafter called "ring-like sequence R") is produced. The internal structure of the ring-like sequence R is important in the processing that follows.

The azimuth computation section 3 makes a simple examination of the internal structure of the ring-like sequence R and, based on the result, directs the processing procedure along one of three branches.

For the purpose of simply and clearly representing the internal structure of the ring-like sequence R, finite sequences are defined below.

"S0" and "S0'" are defined as "finite sequence of one or more terms, all of which are 0" (Example: {0, . . . , 0}).

"S1" is defined as "finite sequence of one or more terms, all of which are 1" (Example: {1, . . . 1}).

"S2" is defined as "finite sequence of one or more terms, all of which are 2" (Example: {2, 2}).

These definitions enable clear and simple representation of the internal structure of the ring-like sequence R.

For the purpose of clearly describing satellite azimuths associated with a term in the finite sequences, several valuable are defined below.

"e0" is defined as "the number of terms included in the finite sequence S0".

"m0" is defined as "the minimum integer not falling below (e0)/2".

"e0'" is defined as "the number of terms included in the finite sequence S0'".

"m0'" is defined as "the minimum integer not falling below (e0')/2".

"e1" is defined as "the number of terms included in the finite sequence S1".

"e2" is defined as "the number of terms included in the finite sequence S2".

"A(S, n)" is defined as "the satellite azimuth associated with the n-th term in finite sequence S".

Simple combinations with these notations can contain exact meanings as described below.

"A(S0, 1)" is defined as "the satellite azimuth associated with the first term in finite sequence S0".

"A(S0, m0)" is defined as "the satellite azimuth associated with the middle term in finite sequence S0".

"A(S0', 1)" is defined as "the satellite azimuth associated with the first term in finite sequence S0'".

"A(S0', m0')" is defined as "the satellite azimuth associated with the middle term in finite sequence S0'".

"A(S1, 1)" is defined as "the satellite azimuth associated with the first term in finite sequence S1".

"A(S1, e1)" is defined as "the satellite azimuth associated with the last term in finite sequence S1".

"A(S2, 1)" is defined as "the satellite azimuth associated with the first term in finite sequence S2".

"A(S2, e2)" is defined as "the satellite azimuth associated with the last term in finite sequence S2".

For the purpose of clearly making an operation of azimuths, it is useful that a notation about a circular permutation which consists of azimuths a, b, c.

Consider there are known or unknown azimuths a, b, c that are able to be plotted on a circle according to their values or order information obtained by some method. If these were read out in the clockwise direction along the circle from arbitrary start point and the result found out was "a, b, c, (and return to the start)", the notation "a<b<c" is defined to describe this circular permutation of the azimuths a, b, and c.

With regards to this definition, it should be noted that the last azimuth is followed by the first azimuth. Based on this property, the following descriptions indicate the identical circular permutation.

"a<b<c"

"b<c<a"

"c<a<b"

Table 1 is a list showing all cases on the ring-like sequence of the discrimination results in an embodiment of a device for acquiring azimuth information according to the present invention.

In Table 1, the first column indicates case ID. The second column indicates the combination of the numbers of finite sequences, i.e., SO, SO', S1, and S2, in the ring-like sequence R. The third column indicates the probability of occurrence of each case, which is roughly estimated. The fourth column indicates the name of a group of resembling cases, which is called sate.

As shown in Table 1 below, cases represent combinations of the number of each finite sequence in the ring-like sequence R.

Case 1 indicates a combination of (0, 0, 0, 0) as (the number of SO, the number of SO', the number of S1, the number of S2) in the ring-like sequence R.

Case 2 indicates a combination of (1, 0, 0, 0).

Case 3 indicates a combination of (1, 1, 0, 0).

Case 4 indicates a combination of (0, 0, 0, 1).

Case 5 indicates a combination of (0, 0, 1, 0).

Case 6 indicates a combination of (0, 0, 1, 1).

Case 7 indicates a combination of (1, 0, 0, 1).

Case 8 indicates a combination of (1, 1, 0, 1).

Case 9 indicates a combination of (1, 0, 1, 0).

Case 10 indicates a combination of (1, 1, 1, 0).

Case 11 indicates a combination of (1, 0, 1, 1).

Case 12 indicates a combination of (1, 1, 1, 1).

Case 13 indicates a combination of (more than 1, any number, any number, any number).

Case 14 indicates a combination of (any number, more than 1, any number, any number).

Case 15 indicates a combination of (any number, any number, more than 1, any number).

Case 16 indicates a combination of (any number, any number, any number, more than 1).

State A consists of case 4, 5 and 6.

State B consists of case 7, 8, 9, 10, 11 and 12.

State C consists of case 2 and 3.

State D consists of case 1.

State E consists of case 13, 14, 15 and 16.

TABLE 1

| Case ID | The number of finite sequences in the ring-like sequence R | | | | Probability of the occurence | State ID |
| --- | --- | --- | --- | --- | --- | --- |
| | SO | SO' | S1 | S2 | | |
| 1 | 0 | 0 | 0 | 0 | Rare | D |
| 2 | 1 | 0 | 0 | 0 | Rare | C |
| 3 | 1 | 1 | 0 | 0 | Rare | C |
| 4 | 0 | 0 | 0 | 1 | Rare | A |
| 5 | 0 | 0 | 1 | 0 | Rare | A |
| 6 | 0 | 0 | 1 | 1 | Very often | A |
| 7 | 1 | 0 | 0 | 1 | Rare | B |
| 8 | 1 | 1 | 0 | 1 | Rare | B |
| 9 | 1 | 0 | 1 | 0 | Rare | B |
| 10 | 1 | 1 | 1 | 0 | Rare | B |
| 11 | 1 | 0 | 1 | 1 | Often | B |
| 12 | 1 | 1 | 1 | 1 | Rare | B |
| 13 | >1 | any | any | any | Impossible | E |
| 14 | any | >1 | any | any | Impossible | E |
| 15 | any | any | >1 | any | Impossible | E |
| 16 | any | any | any | >1 | Impossible | E |

The procedure of analysis on the internal structure of the ring-like sequence R is described below.

The terms of ring-like structure R are replaced with S0, S1, S2 and the numbers of finite sequences S0, S1 and S2 are checked.

If two SOs are found, one SO remains as it is and the other SO is renamed SO'. This results in case 12. By the procedure up to now, the internal structure of the ring-like sequence R falls into one of cases, except cases 3, 8 and 10, listed in Table 1.

When the case corresponds to 2 or 7 or 9, the internal structure of SO is discussed moreover. In these cases, a new ring-like sequence Sr is virtually created by connecting the last term in finite sequence SO to the first term in finite sequence SO. If there is an interval more than 175 degrees and less than 185 degrees between two satellite azimuths associated with two adjacent terms in the ring-like sequence Sr, there must be another interval more than 175 degrees and less than 185 degrees between two satellite azimuths associated with adjacent terms in the ring-like sequence Sr. If two such points are found in the ring-like sequence Sr, Sr is divided, at the each point, into a new finite sequence SO and a new finite sequence SO'. Cases 3, 8 and 10 can be derived from cases 2, 7 and 9 respectively by this procedure.

When the ring-like sequence R is considered as case 4, the first term and the last term of S2 are discriminated with the following procedure. When an interval of satellite azimuths associated with clockwise adjacent terms in the ring-like sequence R is equal to or more than 180 degrees, the two adjacent terms will be considered the last and first terms of S2.

When the ring-like sequence R is considered as case 5, the first term and the last term of S1 are discriminated with the following procedure. When an interval of satellite azimuths associated with clockwise adjacent terms in the ring-like sequence R is equal to or more than 180 degrees, the two adjacent terms will be considered the last and first terms of S1.

All possible cases produced by the procedure described above are shown in Table 1.

When the examination by the azimuth computation section 3 finds the ring-like sequence R to be in state "A", i.e., case 4, case 5 or case 6 in Table 1, the measurement direction 5 can be defined by at most two conditions and its azimuth limitation be immediately effected. Specifically, the azimuth computation section 3 makes the following procedure (wherein the azimuth of the measurement direction 5 is defined as z).

In the case of state "A," the first item of azimuth information that can be acquired is that: when there is S1, the azimuth of the measured direction (azimuth z) is present within an azimuth range defined in the clockwise direction between a start azimuth that is the satellite azimuth associated with the last term of the finite sequence S1 and an end azimuth that is the azimuth opposite the satellite azimuth associated with the first term of the finite sequence S1.

The second item of azimuth information that can be acquired in state "A" is that: when there is S2, the azimuth of the measured direction (azimuth z) is present within an azimuth range defined in the clockwise direction between a start azimuth that is the azimuth opposite the satellite azimuth associated with the last term of the finite sequence S2 and an end azimuth that is the satellite azimuth associated with the first term of the finite sequence S2.

The azimuth computation section 3 can immediately limit the azimuth range in which the measurement direction 5 can be present (without need for rotation etc. of the antennas) from the logical product of the aforesaid two items of azimuth information. The result of the azimuth limitation is sent to the result output section 4.

When the examination by the azimuth computation section 3 finds the ring-like sequence R to be in state "B", i.e., case 7, 8, 9, 10, 11, or 12 in Table 1, azimuth determination of the measurement direction 5 is effected.

A pseudo code description of the azimuth limitation on the state "A" is shown below.

If there is S1
A(S1,e1)<z<A(S1,1)+180
Endif
If there is S2
A(S2,e2)+180<z<A(S2,1)
Endif When the sate of the ring-like sequence R is "B" and it includes S1, the procedure to be executed described. If the result of the examination on a proposition of "A(S1,e1)<A(SO,mO)<A(S1,1)+180" is true, z=A(SO,mO). If the result is false, z=A(SO,mO)+180.

When the sate of the ring-like sequence R is "B" and it does not include S1, the procedure to be executed described. If the result of the examination on a proposition of "A(S2,e2)<A(SO,mO)<A(S2,1)+180" is true, z=A(S0,m0)+180. If the result is false, z=A(SO,mO).

The result of the azimuth determination obtained in this way is sent to the result output section 4.

A pseudo code description of the azimuth determination on the state "B" is shown below.

If there is S1
If A(S1,e1)<A(SO,mO)<A(S1,1)+180
z=A(SO,mO)
Else
z=A(SO,mO)+180.
Endif
Else if there is S2
If A(S2,e2)<A(S0,m0)<A(S2,1)+180
z=A(SO,mO)+180
Else
z=A(S0,m0)
Endif
Endif The minimum condition for azimuth limitation is that "at least one satellite is present either in one antenna's coverage area in the sky or the other antenna's coverage area in the sky". This corresponds to either "e2=1 in case 4" or "e1=1 in case 5".

On the other hand, the minimum condition for azimuth determination is that "at least one satellite is present either in one antenna's coverage area in the sky or the other antenna's coverage area in the sky and at least one satellite is present at the border of the two antennas'coverage areas". This corresponds to either "e2=1 and e0=1 in case 7" or "e1=1 and e0=1 in case 9"

When the examination by azimuth computation section 3 finds the ring-like sequence R to be in state "C" in Table 1, it shows that signal(s) from only satellite(s) present at a great circle is obtained. Because the occurrence of the situation is rare, it suffices that the azimuth computation section 3 causes the result output section 4 to advice the user to go to spot where the sky is more open. (Strictly speaking, the user can obtain the azimuth information even in this state as described below. At first, the measurement direction (z) is described either "z=A(SO,mO) or A(SO,mO)+180". Secondly, the user can also be advised to rotate about 10 degrees in clockwise. After the action, the state will result in state "A" or state "B", where azimuth limitation or azimuth determination is possible. Besides, if it results in state "A", the original measurement direction z' can be determined. If there is S1, z'=A(S1,1). If there is not S1 but S2, z'=A(S2,1)+180.)

When the examination by azimuth computation section 3 finds the ring-like sequence R to be in state "D" in Table 1, it shows the probability of the sky being obstructed is very high. The azimuth computation section 3 causes the result output section 4 to advice the user to go to spot where the sky is more open.

When the examination by azimuth computation section 3 finds the ring-like sequence R to be in state "E" in Table 1, it shows that geometrically impossible situation is detected. The azimuth computation section 3 causes the result output section 4 to advice the user to wait the final result in a few moments. The frequency of detecting these geometrically impossible cases is very low. Their occasional detection is believed to be due to some kind of temporally signal interference in the 1.5-GHz band from other electrical devices.

When the result received by the result output section 4 is azimuth limitation or azimuth determination of the measurement direction, the result output section 4 outputs the result to the user as an audible message. When the result is one of errors, the result output section 4 outputs an audible message. Although output of an audible message has the advantage of permitting even a visually impaired person to receive support regarding appropriate action, the output can alternatively be output on a liquid crystal display. The information output can include: azimuth information for the measurement direction (result of azimuth limitation or azimuth determination), current time (GPS time), latitude, longitude, altitude, positioning calculation time, and advice to the user in the case of errors.

Regarding the method of outputting the azimuth of the measurement direction 5 in azimuth limitation, if the rotation direction has been always fixed, a message can be communicated to the user by providing the set (α, β), where α is the start azimuth and β is the end azimuth. However, it is also possible to define a rough azimuth (hereinafter θ) and a unilateral deviation (hereinafter δ), and to output an audible message or the like in the form of (θ, δ). In this case, it suffices to define θ={α+(|, β−α|/2)} MOD 360, δ=|β−α|. The operation denoted by, |β−α| here is defined as an operator indicating the magnitude of the angle formed in the clockwise direction where α is the start azimuth and, β is the end azimuth. Taking into account the fact that 0 degree and 360 degrees are the same, the remainder operator MOD is used to generate the residue after being divided by 360. (α, β), Either of the (α, β) mode information where the direction of rotation has been fixed and ((θ, δ) mode information can be immediately converted to the other. The user can be supplied with information in either mode since the modes do not particularly differ in the numerical significance of the information conveyed. It is therefore possible to enhance user convenience by enabling the user to select whichever mode is more suitable for the purpose at hand. Otherwise the information can be output in both modes.

This concludes the explanation of the processing procedure as viewed from the side of the device. In the following, the procedure from the viewpoint of the user will also be explained to clarify the flow of the information acquisition processing more specifically.

An overview will be given first. When the measurement direction has been arbitrarily selected, azimuth limitation is immediately possible without rotation if the state of the ring-like sequence R is "A." A user who desires one level of precision higher than this azimuth limitation, can achieve this purpose by turning within a limited degree of rotation and stopping at some angle to put the state of the ring-like sequence R in the state "B" explained earlier. Or if the arbitrarily selected measurement direction should by chance result in the ring-like sequence R being in the state "B," azimuth determination can be achieved immediately. This will now be explained with reference to an example. For convenience of explanation, azimuth limitation will be explained first and azimuth determination thereafter.

Figure 3:
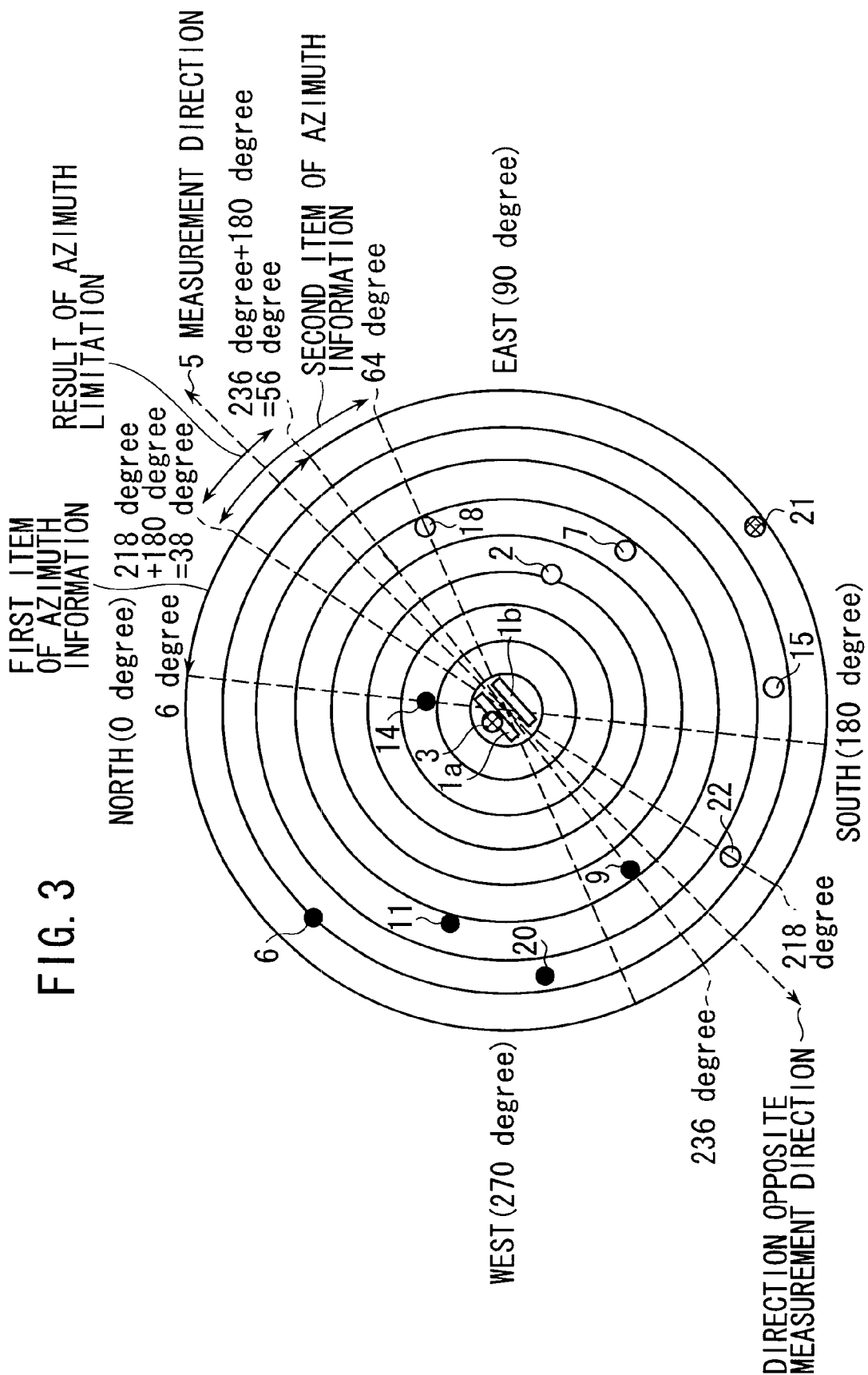
FIG. 3 is a diagram illustrating a relationship between an arrangement of space satellites and two antennas when no satellite is present in the measurement direction at the time azimuth limitation is conducted using the device for erecting azimuth limitation in accordance with the present invention.

FIG. 3 shows an example of the relationship between an arrangement of space satellites and two antennas when azimuth limitation is conducted using the device for acquiring azimuth information according to the foregoing embodiment. The pattern of concentric circles in FIG. 3 represents an imaginary view of the sky hemisphere whose center is zenith at the ground point of the user, taken looking downward from a point higher than zenith. Angle of elevation is 0 degree at the outermost circle and increases inwardly in increments of 10 degrees with each successive concentric circle. Azimuth is denoted as "North (0 degree)", followed clockwise by "East (90 degrees)," "South (180 degrees)," and "West (270 degrees)." The small dots at scattered locations indicate the locations of GPS satellites by angle of elevation and azimuth. Twelve satellites denoted by 2, 3, 6, 7, 9, 11, 14, 15, 18, 20, 21 and 22 are shown. Solid, open and crosshatched dots are used to classify the satellites. A crosshatched dot designates a GPS satellite excluded from further consideration in the course of processing for one of the reasons explained earlier. A black dot designates a GPS satellite later discriminated to be present in the coverage area of the first planar patch antenna 1a. An open dot designates a GPS satellite later discriminated to be present in the coverage area of the second planar patch antenna 1b. The two patch antennas 1a, 1b located at the center are disposed in parallel, back-to-back and perpendicular to the ground.

The user does not know the arrangement of the satellites in the sky viewed from his or her location. The user, who has no information regarding direction (azimuth), places the first planar patch antenna 1a and the second planar patch antenna 1b in an arbitrary direction, as shown in FIG. 3, with the two antennas disposed back-to-back, in parallel and perpendicular to the ground. A dashed line indicates the measurement direction 5. The reason why a dashed, not solid, line represents the measurement direction is that the azimuth will not be determined as a value but be limited in a range. The measurement direction 5 and the reverse direction (diametrically opposite direction) are indicated. At this point the user is still unaware 5 of any such satellite arrangement as illustrated in the drawing.

The process of conducting azimuth limitation with respect to the measurement direction will now be explained in concrete terms. At this point, the user need only wear the device for acquiring azimuth information or hold it stationary and not rotate or otherwise move it.

Based on the results output by the respective GPS receivers 2a, 2b connected to the first and second patch antennas 1a, 1b, the azimuth computation section 3 generates a 12-row, 7-column data chart, in the manner of Table 2 below.

TABLE 2

| Column 1 Satellite ID | Column 2 Satellite azimuth (deg) | Column 3 Satellite elevation (deg) | Column 4 Channel Status in first GPS receiver | Column 5 Channel Status in GPS receiver | Column 6 Exclusion decision | Column 7 Region discrimination |
|---|---|---|---|---|---|---|
| 14 | 6 | 68 | Sync. | — | — | 1 |
| 18 | 64 | 32 | — | Sync. | — | 2 |

TABLE 2-continued

| Column 1 Satellite ID | Column 2 Satellite azimuth (deg) | Column 3 Satellite elevation (deg) | Column 4 Channel Status in first GPS receiver | Column 5 Channel Status in GPS receiver | Column 6 Exclusion decision | Column 7 Region discrimination |
|---|---|---|---|---|---|---|
| 2 | 110 | 49 | — | Sync. | — | 2 |
| 7 | 128 | 31 | — | Sync. | — | 2 |
| 15 | 177 | 15 | — | Sync. | — | 2 |
| 22 | 218 | 13 | — | Sync. | — | 2 |
| 9 | 236 | 32 | Sync. | — | — | 1 |
| 20 | 262 | 12 | Sync. | — | — | 1 |
| 11 | 285 | 28 | Sync. | — | — | 1 |
| 6 | 313 | 9 | Sync. | — | — | 1 |
| 3 | 340 | 86 | Sync. | — | High elevation angle exclusion | |
| 21 | 144 | 4 | — | — | Ground Feature Blocking exclusion | |

The excluded satellites are shown in the bottom two rows. These satellites are not used for acquiring azimuth information.

sequence S0, and no finite sequence S0'." This is the most popular case among 16 cases. This condition is shown Table 3 below

TABLE 3

| Region discrimination | Finite sequences | Satellite azimuth (deg) | Case ID/ State ID | Available function in this case | Result |
|---|---|---|---|---|---|
| 1 | | 6 | | | |
| 2 | | 64 | | | |
| 2 | | 110 | | | |
| 2 | S2 | 128 | 6/A | Azimuth limitation | 38<z>56 clockwise |
| 2 | | 177 | | | |
| 2 | | 218 | | | |
| 1 | | 236 | | | |
| 1 | | 262 | | | |
| 1 | S1 | 285 | | | |
| 1 | | 313 | | | |

The azimuth computation section 3 generates a directional ring-like sequence R composed of the sequence obtained by reading down the seventh column of Table 2, i.e., the region discrimination, to the last item and then returning to the start. R generated from the data in Table 2 becomes "1, 2, 2, 2, 2, 2, 1, 1, 1, 1 (return to start)".

The azimuth computation section 3 first examines the internal structure of the ring-like sequence R as a set of finite sequences S1, S2, S0 and S0'. As a result, the state of the ring-like sequence R is found to coincide with case 6 in state "A," i.e., "the ring-like sequence R consists of only one finite sequence S1, only one finite sequence S2, no finite The azimuth computation section 3 commences processing for the case 6 in state "A." The first item of azimuth information and the second item of azimuth information can be acquired when the state of sequence R is "A"

The azimuth computation section 3 discriminates as the aforesaid first item of azimuth information that the measurement direction is present in an azimuth range defined in the clockwise direction between the satellite azimuth associated with the last term of the single finite sequence S1 (i. e., 6 degrees) as the start azimuth and the azimuth opposite the satellite azimuth associated with the first term of the single finite sequence S1 (i.e., 236+180=56 degrees) as the end azimuth.

In other words, the measurement direction (z) is concluded to be in the range defined clockwise between a start azimuth of 6 degrees and an end azimuth of 56 degrees.

The range specified by the first item of azimuth information, i.e., the range defined clockwise between the start azimuth of 6 degrees and the end azimuth of 56 degrees, is indicated in FIG. 3 by an arc with an arrowhead at either end.

The azimuth computation section 3 discriminates as the aforesaid second item of azimuth information that can be acquired in state "A" that the measurement direction (z degrees) is present in an azimuth range defined in the clockwise direction between the azimuth opposite the satellite azimuth associated with the last term of the single finite sequence S2 as the start azimuth (i.e., 218+180=38 degrees) and the satellite azimuth associated with the first term of the single finite sequence S2 (i.e., 64 degrees).

Specifically, the azimuth computation section 3 discriminates that the measurement direction (z degrees) is present in the range defined clockwise between a start azimuth of 38 degrees and an end azimuth of 64 degrees.

The range specified by the second item of azimuth information, i.e., the range defined clockwise between the start azimuth of 38 degrees and the end azimuth of 64 degrees, is indicated in FIG. 3 by an arc with an arrowhead at either end drawn at the upper right of the outer circle.

The azimuth computation section 3 can immediately limit the azimuth range in which the measurement direction 5 can be present (without need for rotation etc. of the antennas) from the logical product of the aforesaid two items of azimuth information. Specifically, the azimuth computation section 3 can determine that the measurement direction 5 is present within the range defined clockwise between a start azimuth of 38 degrees and an end azimuth of 56 degrees.

The azimuth range for final output range is indicated in FIG. 3 by an arc with an arrowhead at either end extending between the start azimuth of 38 degrees and the end azimuth of 56 degrees.

In this way, the device for acquiring azimuth information according to this embodiment can immediately achieve azimuth limitation without need for rotating the device antennas. If the ring-like sequence R shows case 4 or 5 in state "A", azimuth limitation can be made using the second or first item of azimuth information. The case 4 or 5 means localization of satellites to a half side of the sky and its occurrence is very rare.

The user is informed of the result by voice/sound or a displayed image. When the rotation direction is fixed and the result is expressed in the form of the start-and-end azimuth set ($\alpha$, $\beta$), the output is (Start: 38 degrees, End: 56 degrees). When expressed in the form of the set ($\theta$, $\delta$) composed of a rough azimuth ($\theta$) and a unilateral deviation ($\delta$), which is another possible mode of azimuth limitation expression, the output is (Rough value: 74 degrees, Unilateral error: 9 degrees).

Practical examples of the two expression modes will be explained.

Say, for instance, the user knows an azimuth in which one should absolutely not advance from the current location and wishes to go about some activity while promptly ascertaining that each considered direction of advance is not that direction. The ($\alpha$, $\beta$) output mode is convenient for this purpose. An example of this type of situation would be where a visually impaired person learns of a nuclear plant accident and must rapidly move away from the site of the accident (a certain latitude and longitude), on foot, for example, without waiting for help to arrive. If the person should wait for help or spend time determining which way to flee, he or she would be in danger of exposure to a level of radiation that might lead to health problems in the future. Another example would be where a hiking party crosses an area known for frequent avalanches and must move quickly while regularly confirming that the party is not proceeding into the orientation of the particularly dangerous area. The ($\alpha$, $\beta$) output mode is also effective in such cases. This is so because a person walking across a snowfield has few ground features by which to obtain visual feedback for course correction and, moreover, if visibility should be reduced to zero by fog or snow, will have no possibility whatsoever of obtaining feedback for course control from visual information. Persons in such circumstances usually have the impression of walking straight but in fact eventually start following a curved course and not infrequently stray into dangerous areas. At such times, the convenience of being promptly able to determine the direction in which one is facing or looking to within a certain azimuth range, without need for turning about or the like, is tremendous.

On the other hand, when a person wants to know the azimuth of a specific direction of interest, and is more concerned about speed than accuracy, the latter ($\theta$, $\delta$) mode is convenient for its intuitiveness. This mode is useful, for example, when numerous similar topographical and/or ground features are in view and the person has difficulty identifying them individually without azimuth (direction) information. An example of such a situation would be where a person does not have time to stop to acquire azimuth information and then use it to identify certain topographical or ground features, but if able to acquire approximate azimuth information regarding the direction in which his/her face are directed, would, by that alone, be able to identify a certain mountain or a certain building from among a number of objects in the view. Since no turning (rotation) is necessary, the user can take instantaneous advantage of azimuth limitation while continuing to walk.

The procedure by which, when the ring-like sequence R is discriminated to be in state "A," the measurement direction 5 is immediately (i.e., without rotating the measurement direction 5) derived as falling within a certain azimuth range defined by a start azimuth, an end azimuth, and a directional property such as clockwise rotation is illustrated in Table 2, Table 3 and FIG. 3. It is also shown that two output modes are possible in the azimuth limitation. As will be explained later, the probability of state "A" occurring when the device is arbitrarily oriented under the open sky is greater than 90%. All correspond to case 6.

Assume that an azimuth limitation result has been obtained with respect to the measurement direction 5. When it is then desired to go a step further to acquire an azimuth determination, the user holds the device for acquiring azimuth information horizontally and rotates it either clockwise or counterclockwise. If the user puts on the device, he/she turns either clockwise or counterclockwise.

As the rotation proceeds, the azimuth computation section 3 detects that the number 0 has occurred in the seventh column in Table 2, i.e., that a ring-like sequence R having a finite sequence SO in its internal structure has occurred. The azimuth computation section 3 informs the user of this fact by issuing a special sound through the result output section 4. The user responds by stopping the horizontal rotation.

Figure 4:
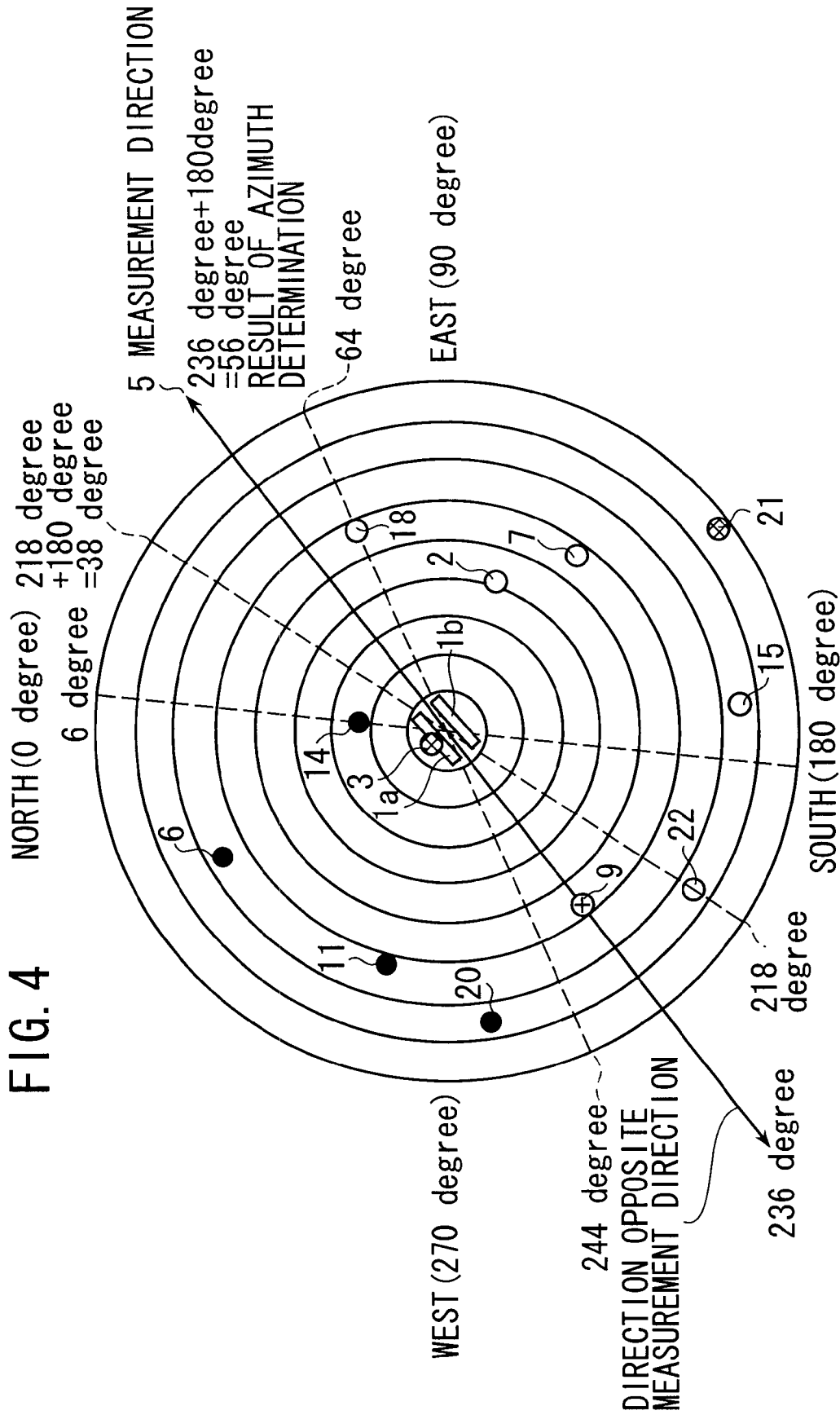
FIG. 4 is a diagram illustrating a relationship between an arrangement of space satellites and two antennas when a satellite is present in the direction opposite the measurement direction at the time azimuth limitation is conducted using the device for effecting azimuth determination in accordance with the present invention.

FIG. 4 shows another example of the relationship between an arrangement of space satellites and two antennas when azimuth determination is conducted using the device for acquiring azimuth information according to an embodiment of the present invention. The pattern of concentric circles in FIG. 4 represents an imaginary view of the sky hemisphere whose center is zenith at the ground point of the user when the aforesaid rotation has been stopped, taken looking downward from a point higher than zenith. Angle of elevation is 0 degree at the outermost circle and increases inwardly in increments of 10 degrees with each successive concentric circle. Azimuth is denoted as "North (0 degree)", followed clockwise by "East (90 degrees)," "South (180 degrees)," and "West (270 degrees)." The small dots at scattered locations indicate the locations of GPS satellites by angle of elevation and azimuth. Twelve satellites denoted 2, 3, 6, 7, 9, 11, 14, 15, 18, 20, 21 and 22 are shown. Solid, open, crosshatched and plus-sign (+) dots are used to classify the satellites. A crosshatched dot designates a GPS satellite excluded from further consideration in the course of processing. A black dot designates a GPS satellite later discriminated to be present in the coverage area of the first planar patch antenna 1a. An open dot designates a GPS satellite later discriminated to be present in the coverage area of the second planar patch antenna 1b. A plus-sign dot designates a GPS satellite later discriminated to be present at the boundary between the coverage areas of the first planar patch antenna 1a and the second planar patch antenna 1b. The two patch antennas 1a, 1b located at the center are disposed in parallel, back-to-back and perpendicular to the ground.

The direction opposite the measurement direction 5 in the concentric circle pattern of FIG. 4 coincides in azimuth with satellite 9. The explanation here assumes that this coincidence would arise as a result of first effecting azimuth limitation in the state of FIG. 3 and then rotating the horizontally maintained device for acquiring azimuth information clockwise, for example, until reaching the state shown in FIG. 4. However, the explanation with respect to FIG. 4 is also applicable to the case where the alignment of the measurement direction 5 with the satellite 9 occurred by chance when the device for acquiring azimuth information was first placed in an arbitrary orientation.

The data chart generated by the azimuth computation section 3 at this time is shown in Table 4 below. The excluded satellites are shown in the bottom two rows. These satellites are not used in the ensuing processing

TABLE 4

| Column 1 Satellite ID | Column 2 Satellite azimuth (deg) | Column 3 Satellite elevation (deg) | Column 4 Channel Status in first GPS receiver | Column 5 Channel Status in GPS receiver | Column 6 Exclusion decision | Column 7 Region discrimination |
|---|---|---|---|---|---|---|
| 14 | 6 | 68 | Sync. | — | — | 1 |
| 18 | 64 | 32 | — | Sync. | — | 2 |
| 2 | 110 | 49 | — | Sync. | — | 2 |
| 7 | 128 | 31 | — | Sync. | — | 2 |
| 15 | 177 | 15 | — | Sync. | — | 2 |
| 22 | 218 | 13 | — | Sync. | — | 2 |
| 9 | 236 | 32 | Sync. | — | — | 0 |
| 20 | 262 | 12 | Sync. | — | — | 1 |
| 11 | 285 | 28 | Sync. | — | — | 1 |
| 6 | 313 | 9 | Sync. | — | — | |
| 3 | 340 | 86 | Sync. | — | High elevation angle exclusion | |
| 21 | 144 | 4 | — | — | Ground feature blocking exclusion | |

The azimuth computation section 3 generates a directional ring-like sequence R composes of the sequence obtained by reading down the seventh column of Table 4 to the last term and then returning to the start. The ring-like sequence R generated from the data in Table 4 becomes "1, 0, 2, 2, 2, 2, 1, 1, 1, 1 (return to start)".

The azimuth computation section 3 first examines the internal structure of the ring-like sequence R as a set of finite sequences S1, S2, SO and SO'. As a result, the ring-like sequence R is found to coincide with case 11 in state "B," i.e., "the ring-like sequence R consists of only one finite sequence S1, only one finite sequence S2, only one finite sequence finite sequence SO'." This condition is shown in Table 5 below.

TABLE 5

| Region discrimination | Finite sequences | Satellite azimuth (deg) | Case ID/ State ID | Available function in this case | Result |
|---|---|---|---|---|---|
| 1 | S1 | 6 | | | |
| 2 | S2 | 64 | 11/B | Azimuth determination | Z = 56 deg |
| 2 | | 110 | | | |
| 2 | | 128 | | | |
| 2 | | 177 | | | |
| 2 | | 218 | | | |
| 0 | SO | 236 | | | |
| 1 | S1 | 262 | | | |
| 1 | | 285 | | | |
| 1 | | 313 | | | |

The azimuth computation section 3 therefore commences processing for the case of the state of the ring-like sequence R being "B."

Because there is S1 in the ring-like sequence R, the proposition of "A(S1,e1)<S(SO,mO)<A(S1,1)+180" is examined as described earlier. The proposition will be "6<236<(262+1801" and this will be "6<236<82". This proposition turns out false. This implies that the A(SO,mO) is caught in the direction opposite the measurement direction. Therefore, z=A(SO,mO)+180=236+180=56.

Cases 7, 8, 9 and 10 in state "B" in Table 1 indicate GPS satellites localization to a half of the sky. The occurrence of these cases is rare. Case 12 in state "B" indicates GPS satellites are caught in the measurement direction and the direction opposite the measurement direction. Its occurrence is also rare.

As explained above, azimuth determination can be achieved by rotating the device for acquiring azimuth information in the clockwise or counterclockwise direction after conducting azimuth limitation.

Regarding this operation, use of the device can be facilitated by the following facts. First, there is an upper limit with respect to this rotation angle necessary to achieve azimuth determination after conducting azimuth limitation. Secondly, the user knows the upper limit before starting the rotation. These will be explained by an example of rotation of the device necessary to achieve azimuth determination (FIG. 4) after conducting azimuth limitation (FIG. 3).

For instance, when azimuth limitation has been carried out in the manner of Table 2, Table 3 and FIG. 3, it suffices to rotate the measurement direction 5 within the upper limit of twice the unilateral deviation (δ), i. e., bilateral deviation (2 δ), which has been described earlier. The fact that the bilateral deviation is the upper limit is clear from FIG. 3. In FIG. 3, the measurement direction 5 or the direction opposite the measurement direction can catch one satellite within less than the bilateral deviation (2 δ). The rotation can be either clockwise or counterclockwise. In the case of clockwise horizontal rotation, the satellite 9 is caught within a rotation angle of less than 2 δ. This is the state shown in FIG. 4. In the case of counterclockwise horizontal rotation, the satellite 22 is caught within a rotation angle of less than 2 δ.

The fact that rotation within an upper limit angle of 2 δ suffices, i.e., that rotation over a large angle is not required, provides the following benefits:

(1) From the user's viewpoint, the desired azimuth determination can be readily achieved with minimum effort because a large amount of rotation more than the upper limit is not needed.

(2) At the time of obtaining the azimuth limitation result, the maximum time needed for azimuth determination can be estimated. During an outdoor activity, therefore, the user can decide whether he or she has enough time to go on to the next step of azimuth determination.

The foregoing demonstrates that with the device for acquiring azimuth information according to the embodiment under discussion, azimuth limitation of the measurement direction 5 can be achieved without rotation and, thereafter, the next step of azimuth determination can be achieved with minimal rotation.

Figure 5A:
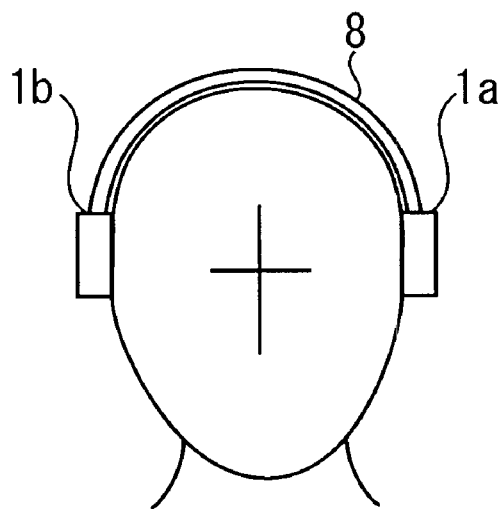
FIG. 5(a) is a front view showing a pair of antennas worn one on either side of a user's head.
Figure 5B:
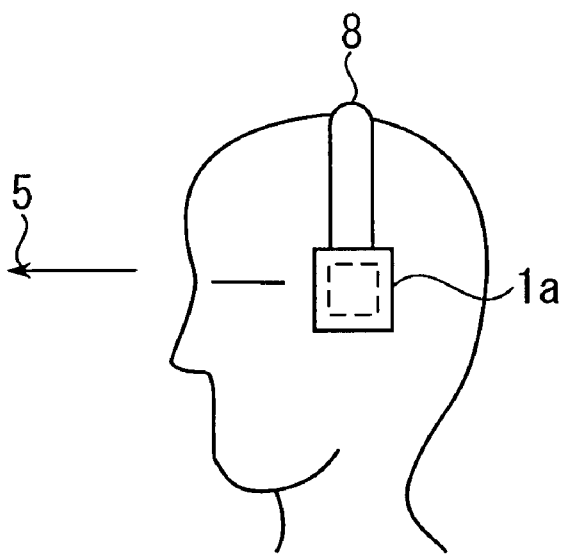
FIG. 5(b) shows the pair of antennas worn one on either side of the user's head of FIG. 5(a) as viewed from the side.
Figure 5C:
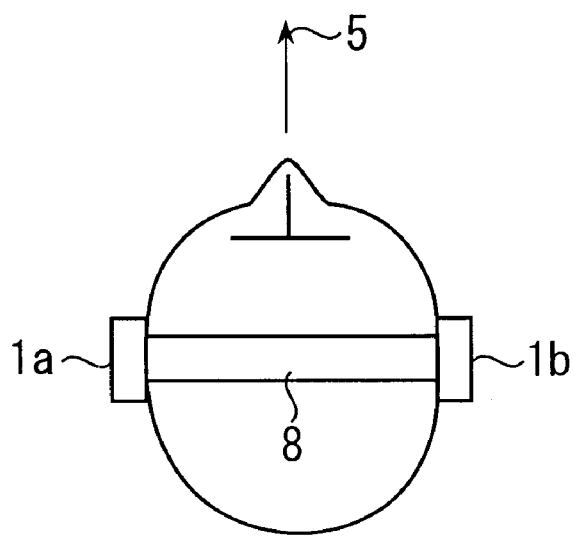
FIG. 5(c) shows the pair of antennas worn one on either side of the user's head of FIG. 5(a) as viewed from above.

The convenience enabled by the structure employing two planar patch antennas disposed in parallel can be enjoyed by structuring the device for acquiring azimuth information for practical use in the manner described in the following. FIG. 5 shows a structure suitable for a device for acquiring azimuth information configured for portability. FIG. 5(a) is a front view showing the device worn on the head. FIG. 5(b) is a left side view showing the device worn on the head. FIG. 5(c) is a top view showing the device worn on the head. In this case of FIG. 5(a), the measurement direction 5 projects perpendicularly from the drawing sheet toward the reader.

The exemplified configuration, i.e., the headband configuration, can be embodied in various similar configurations, such as headphone-like and hat-like configurations, having the following advantages:

(1) The measurement direction 5 of the device always coincides with the direction in which the user faces, which is highly convenient because it provides the user with a direct operation to point the measurement direction to the orientation in which the user is interested and an intuitive understanding of how to utilize the numerical values representing the result of the acquired azimuth information.

(2) Wearing the device for acquiring azimuth information on the head maximizes the vertical projection distance between it and the ground and, as such, minimizes the effect of signal blockage by ground and topographical features.

(3) The user is likely to feel at ease about the appearance of the device when worn because wearing of headbands, other ornaments, headphones, earmuffs and other functional devices on the head is commonplace.

(4) The user is likely to feel at ease about how he or she looks when turning for carrying out azimuth determination because the action can be done naturally in the manner of looking at something in the distance without any specific behaviors which appear strange to other people in the situation of daily life. It is an important point for the vision-impaired person to use this device.

Recent GPS receivers consist of a microprocessor and a printed-circuit board and the size of the physical unit is therefore small. The small size of the constituent components is apparent from the fact that several portable GPS receiving units small enough to hold easily on the palm of the hand are actually available these days. The device for acquiring azimuth information that is an embodiment of the method of acquiring azimuth information according to the present invention can be constituted utilizing-the components used in these portable GPS receiving units and can therefore be realized as a compact unit of small volume. For example, the first GPS receiver 2a and the azimuth computation section 3 can be mounted on the rear surface of the first planar patch antenna 1a. The second GPS receiver 2b and the result output section 4 can be mounted on the rear surface of the second planar patch antenna 1b. A flexible cable can be incorporated in the headband structure for wiring the components in the circuit arrangement of FIG. 2. The result output section 4 can be arranged to output audible messages.

Figure 6:
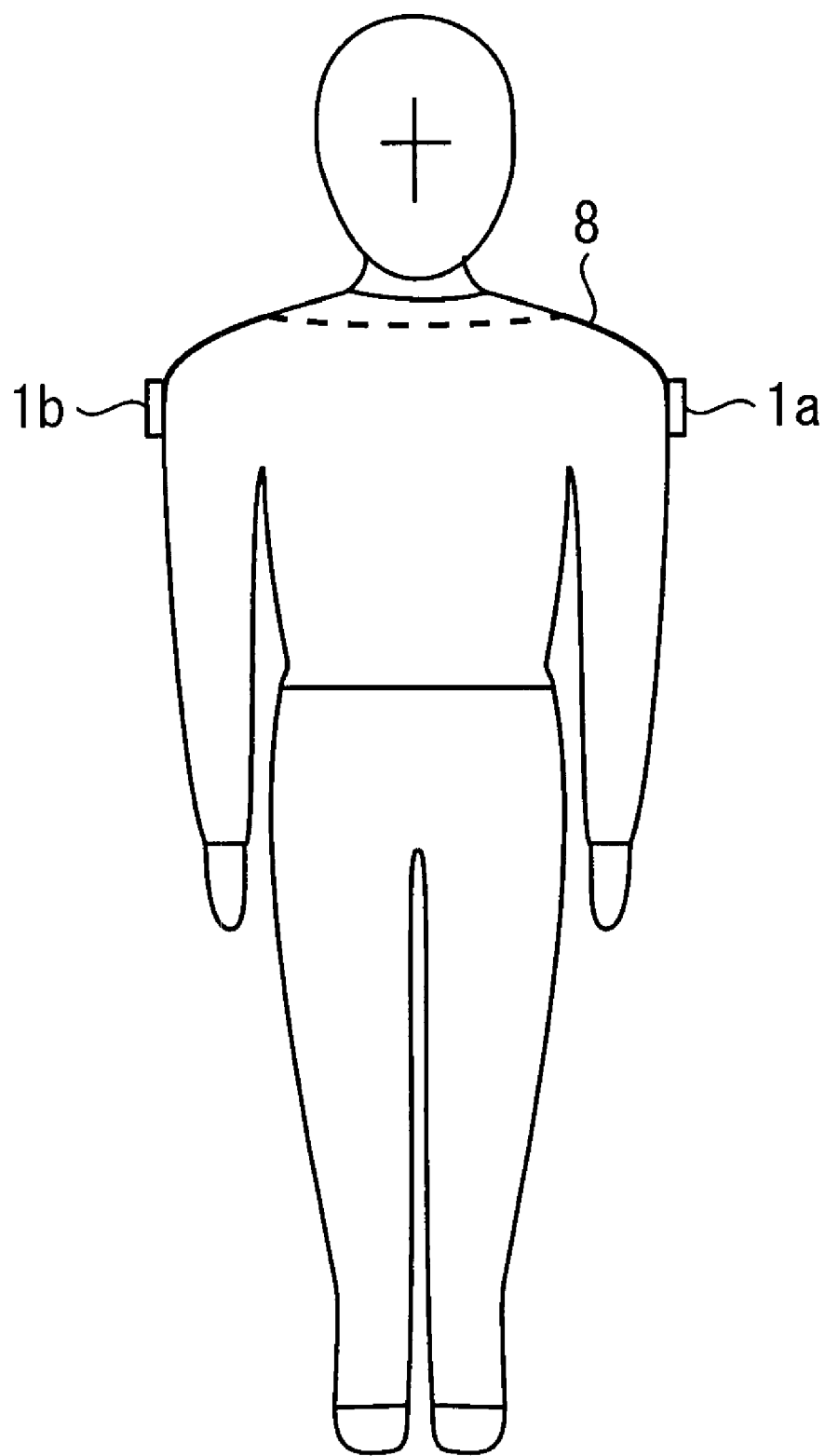
FIG. 6 is a front view illustrating another way of wearing the device for acquiring azimuth information.

Otherwise, as shown in FIG. 6, the first and second patch antennas 1a, 1b can be attached to the exterior of clothing covering the user's arm on either side, e.g., to the outer surface of the upper parts of arms of a jacket. The rule to be followed in mounting the antennas is to attach them to the outside of the clothing at the opposite upper arm portions so as to be perpendicular to the ground, parallel to each other and back-to-back. If, in addition, they are mounted so that their respective plane surfaces lie parallel to the forward direction of the user's body, the measurement direction 5 will be aligned with the forward direction of the body. In this case, the GPS receiver sections can be mounted on the rear surfaces of the planar patch antennas. Space utilization can be maximized by disposing the azimuth computation section and the result output section in spaces available in the antennas supplied with the GPS receiver. When this arrangement is adopted, the portion 8 connecting the two receivers can be a flexible cable that runs from the outside of one arm, over the adjacent shoulder, behind the neck, and over the other shoulder to the other arm. The flexible cable is attached for the duration of use using press-on, strip-off surface fasteners (of the type sold under the trademark Velcro, for example). The azimuth computation section 3 and the result output section 4 can be built into the rear side of one of the planar patch antennas. Otherwise they can be designed to rest at a shoulder portion or at a portion behind the neck.

It is also possible to attach the planar patch antennas on the chest and back in parallel, back-to-back orientation. In this case, if the first planar patch antenna 1a is placed on the back and the second planar patch antenna 1b on the chest, the measurement direction 5 will be directed laterally left from the user's body. When this arrangement is adopted, it is more convenient for the user if the result output section 4 always outputs values converted to those for the direction forward from the user's chest, 45 i.e., values obtained by adding 90 degrees in the clockwise direction. The foregoing structure provides the following advantages:

(1) High utility arid convenience because the measurement direction is aligned with the forward direction of the body.

(2) Ease of use because device rotation requires only small body movement.

(3) Ready user acceptance of wearing mode and appearance.

(4) User can put on clothing of preference. Use of surface fasteners enables easy detachment before laundering.

The antennas can also be mounted at the outsides of the legs or on the outside surfaces of a pair of shoes or boots. In these cases, too, the antenna portions and/or other functional portions can be provisionally attached using surface fasteners. Magnets can also be used. For easy attachment and detachment, the two antennas and the functional portions can be interconnected by a flexible cable passing, for example, from the outer side of one leg across the waist to the outer side of the other leg. Although this arrangement can be expected to degrade ability to catch signals from satellites at a high angle of elevation, owing to the signal blocking effect of the arms etc., this is not much of a problem because, as explained earlier, the invention can operate even without using satellites at a high angle of elevation. Signal blocking by body for high elevation satellites is therefore not a major concern.

As shown in FIGS. 7(a) and 7(b), moreover, the device for acquiring azimuth information of this invention can be mounted on a vehicle with the first and second patch antennas 1a, 1b provided on opposite side surfaces of the car body, in which case the acquired azimuth information can be used as an input signal for autonomous navigation for upgrading the navigating performance of a car navigation system.

In the foregoing, a method of using the human body for horizontally rotating the patch antennas was explained. However, a physically handicapped person who has difficulty turning the head or body will not be able to use the device for acquiring azimuth information in this manner. This invention therefore can also provide a patch antenna rotating mechanism, which will now be explained with reference to FIG. 8.

The first and second patch antennas 1a, 1b are installed back-to-back in parallel on a turntable 9 driven by a stepping motor 10. When azimuth limitation is executed based on the state "A" of the ring-like sequence R, a pulse signal is sent to the stepping motor 10 to rotate the turntable 9 intermittently in prescribed angular increments until it is found that one or more satellites have come to be positioned on the boundary between the coverage areas of the two antennas, i.e., until the state of the ring like sequence R becomes state "B." The turntable 9 is then stopped. The rotational speed adopted depends on the performance of the GPS receivers. For example, if the specifications of the GPS receiver state that up to T seconds may be necessary to "pick up a new signal not currently being received," a two-second period is necessary at each angular position for reliably discriminating whether a new signal has been captured. In this case, it suffices to rotate the turntable 9 intermittently at the rate of 1/T degree per second. If T is 0.1 second, the rate is 10 degree per second.

The cases in which azimuth limitation and azimuth determination are possible, where R is in state "A" and "B" respectively, were discussed. The logics in the cases where the state of the sequence R is in state "C", "D" or "E" were also discussed earlier.

A computer simulation was conducted for determining what level of azimuth limitation values can be acquired in the case of on-the-spot azimuth limitation using the device for acquiring azimuth information that is an embodiment of the method for acquiring azimuth information of the present invention. The results follow.

The computer simulation was conducted using the real-time GPS satellite orbital parameters of actually operating GPS satellites on Feb. 17, 2000 in the sky over the center (latitude N35° 40' 14.9", longitude E139° 45' 33.4") of Hibiya Park in Tokyo (located at middle latitude area in northern hemisphere).

Evaluation was conducted with respect to fixed time points between midnight (0 am) and 11 am (0, 1, 2, . . . 10, 11 am), i.e. with respect to 12 separate fixed time points spaced at regular time intervals. The evaluation was conducted at different time points in order to accurately reflect the fact that the number of available satellites and the satellite constellation in the sky hemisphere vary depending on the time of day.

In order to obtain results as close to reality as possible, the angle of elevation region of 5 degrees and lower easily affected by ground feature signal blocking was defined as being unavailable, and control was effected to exclude high elevation satellites (85-degree and higher satellites) from azimuth computation as explained earlier in this specification.

The arbitrary (random) setting of the measurement direction 5 in actual use was emulated by making random numbers (0–359) to select measurement direction 5 on every trial in the whole simulation.

One thousand random trials were conducted at each time point to enhance the evaluation results and enable consistent assessment.

As 1,000 random simulations were conducted at each of 12 time points, the total number of trials was 12,000.

The computer simulation was conducted assuming a coverage area overlap of width of 25 degrees on either side of the great circle forming boundary. The probability of occurrence of case 6, which was one of the cases of state "A", was 90.1%, in which azimuth limitation was immediately possible. The bilateral error in the 10,812, which corresponds to 90.1% of 12,000 trials, azimuth limitation results was 30.8 degrees.

A maximum of 12 directions at intervals of 30 degrees are commonly used in human daily activities: north, north-northeast, east-northeast, east, east-southeast, south-southeast, south, south-southwest, west-southwest, west, west-northwest and north-northwest. The method of this invention enables azimuth limitation of this level even by random measurement with no rotation. This demonstrates that the invention provides a simple azimuth information acquisition method with great practical utility.

The probability of catching one or more satellites in the measurement direction 5 or the direction opposite the measurement direction at the first time the device is randomly placed (without rotation), thereby enabling immediate azimuth determination, was 9.9%. In other words, the probability of case 11 occurrence, which was one of the cases of state "B", was 9.9%, in which azimuth determination was instantly possible by chance. The chance of being able to conduct azimuth determination immediately is thus relatively high.

The number of available GPS satellites in sky hemisphere viewed from a middle latitude area is usually as many as 9 to 12. This largeness of the number of available satellites in sky hemisphere is believed to be a main factor for the high efficiency of the device for acquiring azimuth information that is an embodiment of the method for acquiring azimuth information of the present invention.

No case other than cases 6 and 11 did occur in the 12,000 random trials. Considering the constellation of GPS satellite is designed not to be localized in a small area of the sky hemisphere but to spread as evenly as possible in the sky hemisphere viewed from a middle latitude area, the probability of GPS satellite localization to a half area of sky hemisphere is very small. Therefore, the simulation result that implied 0% occurrence of GPS satellite localization was reasonable.

The foregoing explanation focuses solely on the azimuth limitation and azimuth determination functions of the device for acquiring azimuth information according to the present embodiment. As is clear from the configuration shown in FIG. 2, however, the device for acquiring azimuth information of this embodiment is equipped with the components needed for determining location (positioning) and is therefore also readily capable of achieving this function. In this case, the positioning results sent to the azimuth computation section 3 from the first GPS receiver 2a or second GPS receiver 2b can be used without modification. For example, it is possible to output to the result output section 4 one or the other of the positioning results from the GPS receivers 2a, 2b, giving preference to the one with the more recent positioning result computation time.

Although the present invention has been described with respect to a specific embodiment illustrated in the drawings, the invention is in no way limited to the described arrangement, and changes and modifications may be made without departing from the scope of the appended claims.

As explained in the foregoing, in accordance with the method and device for acquiring azimuth information of the present invention, limitation of azimuth, i.e., narrowing of azimuth value to a sector-like azimuth value range, can be achieved rapidly and without need for rotation by disposing in an arbitrary direction a pair of planar patch antennas each having a hemispherical antenna pattern arranged back-to back, parallel to each other and vertical, and receiving signals from GPS satellites with the respective planar patch antennas.

Moreover, a device for acquiring azimuth information embodying the azimuth information acquisition method can be manufactured in small size and light weight at low cost by disposing two commercially available planar patch antennas for satellite positioning vertically, back-to-back and in parallel. The device can therefore be realized at a reasonable cost.

Moreover, the fact that the planar patch antennas are characterized by small size and light weight and are placed in parallel enables the device to be implemented in an arrangement highly suitable for wearing on the head or the body. When this arrangement is adopted, the user can enjoy outstanding utility and convenience because the measurement direction remains constantly aligned with the direction in which the user is facing or with the forward direction of the body.

In accordance with the method for acquiring azimuth information of the present invention, once an azimuth range has been obtained by azimuth limitation, azimuth determination can be effected based thereon by horizontal rotation within a definite upper limit, which can be easily known to the user before starting the rotation.

What is claimed is:

1. A method for acquiring azimuth information comprising:
    a step of disposing a pair of planar antennas each having a hemispherical antenna pattern for GPS satellite signals back-to-back, parallel to each other and vertical, whereby each planar antenna forms a sky coverage area of antenna sensitivity that is a sky quarter-sphere in a direction the antenna faces;
    a step of causing a pair of GPS receivers, one connected to each antennas to scan signals transmitted by GPS satellites in the sky hemisphere;
    a step of causing the GPS receivers to output respective channel statuses indicating reception of the signal transmitted by each GPS satellite in the sky hemisphere;
    a step of causing at least one GPS receiver to output satellite azimuth for each GPS satellite in the sky hemisphere;
    a step of discriminating the sky coverage area in which each GPS satellite that transmitted the signal is present, based on a comparison of the channel statuses in the GPS receivers;
    a step of arranging results of the discriminating step in a ring-like sequence of a specific rotational direction, utilizing the satellite azimuths as indices; and
    a step of limiting a measurement direction to be ascertained in an azimuth range defined by a start azimuth, an end azimuth and an orientation of rotation based on information contained in the ring-like sequence of discrimination results obtained in the arranging step.

2. A method according to claim 1, wherein the planar antennas are planar patch antennas.

3. A method according to claim 1, wherein when a signal of a certain GPS satellite is synchronized with by a corresponding pseudo random noise code in a channel of one GPS receiver and the same signal is not synchronized with by a corresponding pseudo random noise code in a channel of the, other GPS receiver, discrimination that the certain GPS satellite is present in the antenna sky coverage area formed by the antenna connected to the one GPS receiver is conducted.

4. A method according to claim 1, wherein when the ring-like sequence of discrimination results consists of one finite sequence which consists of one or more continuous terms indicating presence in the coverage area of one planar antenna, no or one finite sequence which consists of one or more continuous terms indicating presence in the coverage area of the other planar antenna, and no finite sequence which consists of one or more continuous terms indicating presence at a boundary between the antenna coverage areas, the azimuth of the measurement direction to be ascertained is limited in the azimuth range based on satellite azimuths associated with a first term and a last term in the one or two finite sequences and an initial assumption on geometry among the antennas and the measurement direction.

5. A method according to claim 1, wherein the antennas are disposed, one on either side of a user's head.

6. A method according to claim 1, wherein the antennas are disposed, one on either side of a user's body.

7. A method for acquiring azimuth information, comprising:
    a step of disposing a pair of planar antennas each having a hemispherical antenna pattern for GPS satellite signals back-to-back, parallel to each other and vertical, whereby each planar antenna forms a sky coverage area of antenna sensitivity that is a sky quarter-sphere in a direction the antenna faces;
    a step of horizontally rotating the antennas;
    a step of causing a pair of GPS receivers, one connected to each antenna to scan signals transmitted by GPS satellites in the sky hemisphere;
    a step of causing the GPS receivers to output respective channel statuses indicating reception of the signal transmitted by each GPS satellite in the sky hemisphere;
    a step of causing at least one GPS receiver to output satellite azimuth for each GPS satellite in the sky hemisphere;
    a step of stopping the horizontal rotation of each antenna when the antenna reaches an orientation whereat discrimination is conducted that at least one GPS satellite is present at a boundary between the sky coverage areas of the antennas;
    a step of discriminating, with regard to remaining GPS satellites, the sky coverage area in which the GPS satellite that transmitted the signal is present, based on a comparison of the channel statuses;
    a step of arranging results of the discriminating step in a ring-like sequence of a specific rotational direction, utilizing the satellite azimuths as indices; and
    a step of determining an azimuth of a measurement direction to be ascertained based on information contained in the ring-like sequence of discrimination results obtained in the arranging step.

8. A method according to claim 7, wherein the planar antennas are planar patch antennas.

9. A method according to claim 7, wherein when a signal of a certain GPS satellite is synchronized with by a corresponding pseudo random noise code in channels of the GPS receivers, discrimination that the certain GPS satellite is present at a boundary between the sky coverage areas of the antennas is conducted.

10. A method according to claim 7, wherein when the ring-like sequence of discrimination results consists of one first-finite sequence which consists of one or more continuous terms indicating presence in the coverage area of one planar antenna, no or one second-finite sequence which consists of one or more continuous terms indicating presence in the coverage area of the other planar antenna, one third-finite sequence which consists of one or more continuous terms indicating presence at one direction on 45 a boundary between the antenna coverage areas, and no or one fourth-finite sequence which consists of one or more continuous terms indicating presence at the other direction on the boundary between the antenna coverage areas, the azimuth of the measurement direction to be ascertained is determined based on satellite azimuths associated with terms in the one first-finite sequence and the one third-finite sequence, and an initial assumption on geometry among the antennas and the measurement direction.

11. A method according to claim 7, wherein the antennas are disposed, one on either side of a user's head.

12. A method according to claim 7, wherein the antennas are disposed, one on either side of a user's body.

13. A device for acquiring azimuth information comprising:

a pair of planar antennas each having a hemispherical antenna pattern for receiving signals transmitted by GPS satellites, disposed back-to-back, parallel to each other and vertical, whereby each planar antenna forms a sky coverage area of antenna sensitivity that is a sky quarter-sphere in a direction the antenna faces;

a pair of receivers, one connected to each antenna, for receiving signals transmitted by GPS satellites present in the sky coverage areas, conducting positioning concomitantly with calculating azimuths of all satellites, and outputting channel statuses;

means for discriminating which sky coverage area in which each GPS satellite transmitting a signal is present, based on a comparison of the channel statuses in the receivers;

means for arranging results output by the discriminating means in a ring-like sequence of a specific rotational direction based on satellite azimuth information acquired from at least one of the receivers; and means for limiting an azimuth of a measurement direction to be ascertained in an azimuth range which is defined by a start azimuth, an end azimuth and an orientation of rotation and determining the azimuth of the measurement direction to be ascertained as a value, both based on information derived from the thus obtained ring-like sequence of discrimination results.

14. A device according to claim 13, wherein the arranging means is means including as indices satellite azimuths calculated concomitantly with positioning.

15. A device according to claim 13, wherein the antennas are disposed, one on either side of a user's head.

16. A device according to claim 13, wherein the antennas are disposed, one on either side of a user's body.

17. A device according to claim 13, further comprising means for horizontally rotating the antennas at a constant speed within the azimuth range.

* * * * *